US009721332B2

(12) United States Patent
Cruz-Albrecht et al.

(10) Patent No.: US 9,721,332 B2
(45) Date of Patent: Aug. 1, 2017

(54) SPIKE DOMAIN CONVOLUTION CIRCUIT

(71) Applicant: HRL Laboratories, LLC, Malibu, CA (US)

(72) Inventors: Jose Cruz-Albrecht, Oak Park, CA (US); Michael W. Yung, Los Angeles, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/043,478

(22) Filed: Feb. 12, 2016

(65) Prior Publication Data

US 2016/0239947 A1 Aug. 18, 2016

Related U.S. Application Data

(60) Provisional application No. 62/116,858, filed on Feb. 16, 2015.

(51) Int. Cl.
*G06K 9/64* (2006.01)
*G06T 5/20* (2006.01)

(52) U.S. Cl.
CPC ................................ *G06T 5/20* (2013.01)

(58) Field of Classification Search
CPC ... G06T 5/20; G06T 9/00; G06T 7/00; H03M 1/00; H03L 7/0995

(Continued)

(56) References Cited

U.S. PATENT DOCUMENTS 7,403,144 B1 7/2008 Cruz-Albrecht et al.
8,996,431 B2 3/2015 Cruz-Albrecht et al.
(Continued)

FOREIGN PATENT DOCUMENTS

JP 2012-234393 A 11/2012
WO WO 2014/011907 A2 1/2014

OTHER PUBLICATIONS

Cruz-Albrecht, Jose M. et al. "A Low-Energy Spike-Domain Convolution Circuit," *Senior Member, IEEE*, pp. 1-6, 2015.

(Continued)

*Primary Examiner* — Daniel Mariam
(74) *Attorney, Agent, or Firm* — Lewis Roca Rothgerber Christie, LLP

(57) ABSTRACT

A convolution circuit includes: a plurality of input oscillators, each configured to: receive a corresponding analog input signal of a plurality of analog input signals; and output a corresponding spiking signal of a plurality of spiking signals, the corresponding spiking signal having a spiking rate in accordance with a magnitude of the corresponding analog input signal; a plurality of 1-bit DACs, each of the 1-bit DACs being configured to: receive the corresponding spiking signal of the plurality of spiking signals from a corresponding one of the input oscillators; and receive a corresponding weight of a convolution kernel comprising a plurality of weights; output a corresponding weighted output of a plurality of weighted outputs in accordance with the corresponding spiking signal and the corresponding weight; and an output oscillator configured to generate an output spike signal in accordance with the plurality of weighted outputs from the plurality of 1-bit DACs.

20 Claims, 16 Drawing Sheets

(58) Field of Classification Search
USPC .......................................................... 382/279
See application file for complete search history.

(56) References Cited

U.S. PATENT DOCUMENTS

| | | |
|---|---|---|
| 9,286,268 B2* | 3/2016 | Seeman .................. G06F 17/15 |
| 2009/0129696 A1 | 5/2009 | Komatsu et al. |
| 2014/0219579 A1 | 8/2014 | Lischinski et al. |
| 2015/0012800 A1 | 1/2015 | Yang et al. |

OTHER PUBLICATIONS

International Search Report and Written Opinion for corresponding Application No. PCT/US2016/017895, dated Dec. 16, 2016 (9 pages).
Srinivasa, Narayan et al. "Probabilistic inference devices for unconventional processing of signals for intelligent data exploitation," *40th Annu. GOMAC Tech. Conf.*, 4 pages, 2015.

* cited by examiner

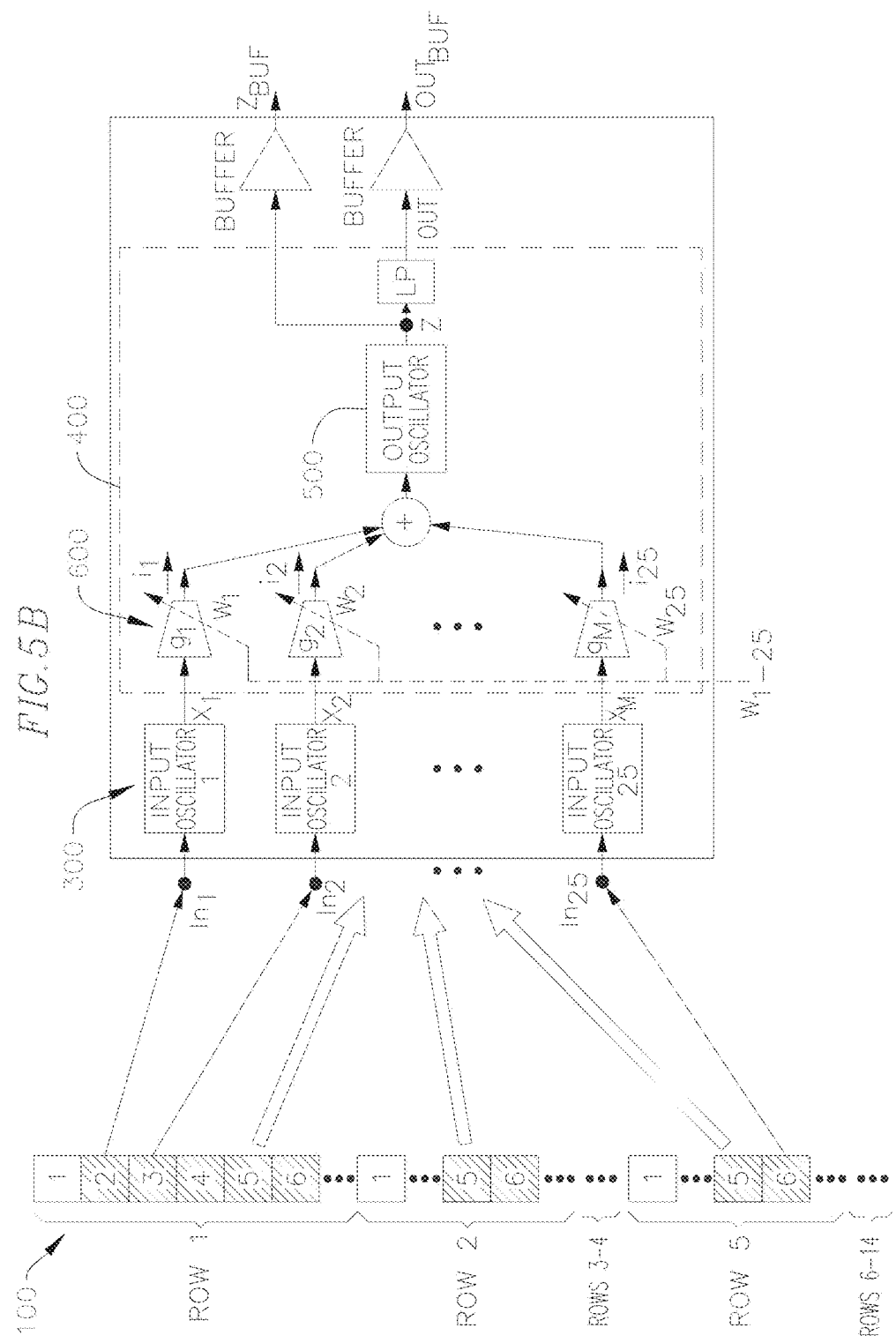

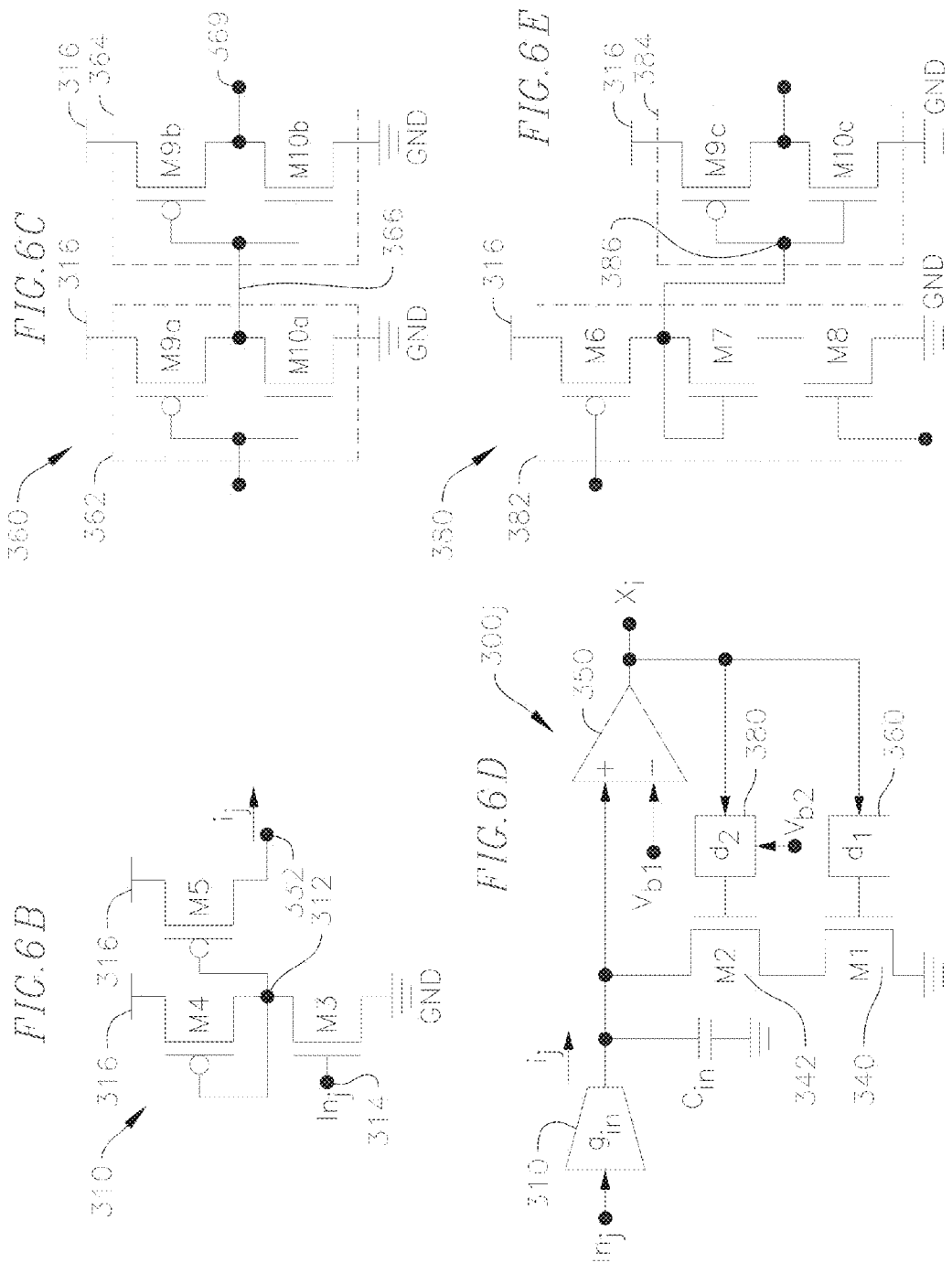

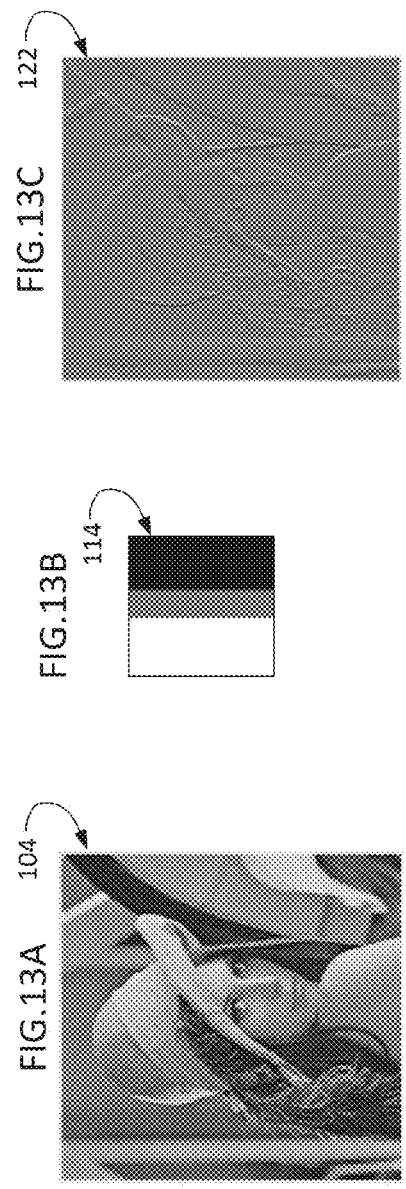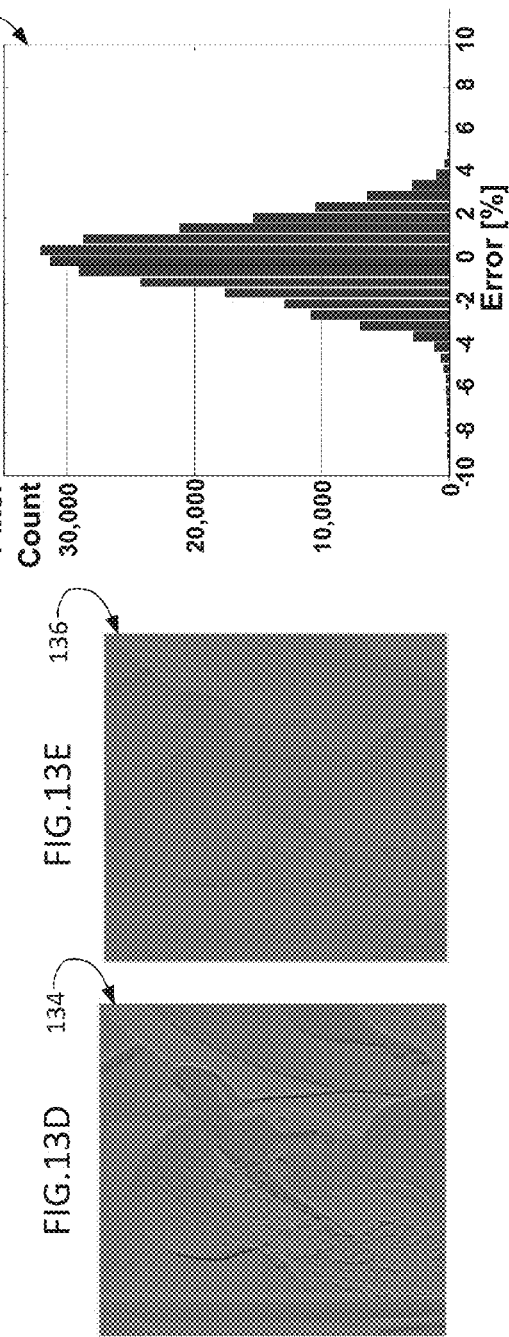

SPIKE DOMAIN CONVOLUTION CIRCUIT

CROSS-REFERENCE TO RELATED APPLICATION(S)

This application claims priority to and the benefit of U.S. Provisional Patent Application No. 62/116,858, "A Spike Domain Convolution Circuit," filed in the United States Patent and Trademark Office on Feb. 16, 2015, the entire disclosure of which is incorporated herein by reference.

STATEMENT REGARDING FEDERALLY SPONSORED RESEARCH OR DEVELOPMENT

The present invention was made with support from the United States Government under Grant No. HRL0011-13-C-0052 awarded by the Defense Advanced Research Project Agency (DARPA). The United States Government has certain rights in this invention.

BACKGROUND

1. Field

Aspects of embodiments of the present invention generally relate to the field of analog processing and a circuit for performing a convolution operation using pulse domain signals.

2. Related Art

Computer vision techniques are frequently used to analyze images automatically in order to identify objects of interest. These techniques have applications in the control of autonomous robots (e.g., unmanned aerial vehicles and self-driving cars), semi-autonomous robots (e.g., a car that automatically detects hazards and alerts a driver or automatically slows the car in response), target recognition and tracking in military systems (e.g., images from radar, infrared cameras, and visible light cameras), and quality control in manufacturing (e.g., automatic visual analysis of products coming off an assembly line for conformance to standards).

Image processing techniques are often applied to low level data in order to identify features for further analysis by higher level algorithms. For example, image processing can be used to detect high contrast edges within an input image, change the contrast of particular portions of the image, etc.

The convolution function is commonly used in image processing for feature detection. FIG. 1 is a schematic diagram illustrating an example of generating an output image 120 of size 10 pixels by 10 pixels from convolving an input image 100 of size 14 pixels by 14 pixels with a kernel 110 of size 5 pixels by 5 pixels to detect portions (or "patches") 102 of the input image 100 that are similar to the kernel 110 (one of these patches 102 is shown in dotted lines in FIG. 1). The kernel 110 in this example is a detector of vertical edges that are dark on the left side and light on the right side. Different features can be detected by convolving the input image 100 with various different kernels.

The output image 120 may be generated by splitting the input image 100 into overlapping input patches 102. The values of the pixels in each of the input patches 102 are multiplied by the kernel 110, and the resulting products are added together to generate a single pixel of the output image 120 corresponding to that input patch.

As seen in the output image 120, the image processing image has identified regions in which there is high contrast along a vertical line. For example, the edge between the right side of small black box in the input image 100 and the white area adjacent it (in columns 10 through 12 of the input image 100) corresponds to the dark portion in columns 8 and 9 of the output image 120, and the edge between the gray outer border and the white middle portion of the input image 100 and correspond to the dark portion in column 1 of the output image 120. Furthermore, the left edge of the black square has a white area to its left. This is the "opposite" of the kernel 110 and therefore results in the negative white.

However, implementing the convolution operation can be computationally intensive (e.g., due to the large number of multiplication operations required) and therefore may have high power (energy) requirements when implemented on a general purpose microprocessor. As a result, it may be difficult for a general purpose microprocessor to be able to meet the cost, power, and/or speed requirements of certain applications.

Pulse and spike domain processors have been previously developed to implement generic neural networks, as described, for example, in "Spike domain and pulse domain non-linear processors" U.S. Pat. No. 7,822,698, the entire disclosure of which is incorporated herein by reference. Other work involving pulse and spike domain processors include "Pulse domain encoder and filter circuits" U.S. Pat. No. 7,403,144 and "Spike domain neuron circuit with programmable kinetic dynamic, homeostatic plasticity and axonal delays" U.S. Pat. No. 8,996,431, the entire disclosures of which are incorporated herein by reference.

In addition, circuits that can perform convolutions in the analog domain using Gilbert-type analog multipliers (e.g., a Gilbert cell) to perform convolutions, as described in Cruz, J. M., and L. O. Chua. "A 16×16 cellular neural network universal chip: the first complete single-chip dynamic computer array with distributed memory and with gray-scale input-output." *Analog Integrated Circuits and Signal Processing* 15.3 (1998): 227-237. However, the circuits in this paper use a power supply of 5V and the accuracy of the convolutions performed by this design is expected to degrade significantly if scaled to operate at a low voltage.

SUMMARY

Aspects of embodiments of the present invention are directed toward a special purpose processor for performing spike domain convolution processing and methods of operating thereof. Embodiments of the present invention are capable of performing the convolution operation without analog or digital multipliers, thereby allowing high speed and low power operation with high accuracy.

According to one embodiment of the present invention, a convolution circuit includes: a plurality of input oscillators, each of the input oscillators being configured to: receive a corresponding analog input signal of a plurality of analog input signals; and output a corresponding spiking signal of a plurality of spiking signals, the corresponding spiking signal having a spiking rate in accordance with a magnitude of the corresponding analog input signal; a plurality of 1-bit DACs, each of the 1-bit DACs being configured to: receive the corresponding spiking signal of the plurality of spiking signals from a corresponding one of the input oscillators; and receive a corresponding weight of a convolution kernel including a plurality of weights; output a corresponding weighted output of a plurality of weighted outputs in accordance with the corresponding spiking signal and the corresponding weight; and an output oscillator configured to generate an output spike signal in accordance with the plurality of weighted outputs from the plurality of 1-bit DACs.

The plurality of weighted outputs may be currents.

The convolution circuit may further include a summing node between the plurality of 1-bit DACs and the output oscillator, wherein the plurality of 1-bit DACs are configured to output the weighted outputs to the summing node, and wherein the output oscillator is configured to generate the output spike signal in accordance with a signal at the summing node.

The convolutional circuit may further include a capacitor coupled between the summing node and ground.

Each of the input oscillators may include: a transconductance amplifier having an input terminal configured to receive the analog input signal and an output terminal coupled to an accumulating node; a capacitor coupled between the accumulating node and ground; a first reset switch coupled between the accumulating node and ground; a comparator having a non-inverting input coupled to the accumulating node and an output coupled to a corresponding one of the 1-bit DACs; and a first delay including: an input coupled to the output of the comparator; and an output configured to control the first reset switch.

Each of the input oscillators may further include: a second reset switch coupled between the accumulating node and the first reset switch; and a second delay including: an input coupled to the output of the comparator; and an output configured to control the second reset switch.

Each of the 1-bit DACs may include: a first current mirror having a gain of 1 including a first terminal and a second terminal; a second current mirror having a gain of 1 including a first terminal coupled to the first terminal of the first current mirror and a second terminal; a third current mirror having a gain greater than 1 including a first terminal and a second terminal coupled to the second terminal of the second current mirror; a bottom differential pair coupled to a current source and configured to receive a reference voltage and the corresponding weight; a first upper differential pair coupled to the bottom differential pair, the first current mirror, and the second current mirror; and a second upper differential pair coupled to the first upper differential pair, the bottom differential pair, the first current mirror, and the second current mirror.

Each of the 1-bit DACs may include: an auxiliary circuit including: a first input terminal configured to receive the corresponding weight; a second input terminal configured to receive the corresponding spiking signal; a first output terminal configured to output an absolute value of the corresponding weight; and a second output terminal configured to output a plurality of control signals; and a DAC core including: a first current mirror; a second current mirror; a plurality of current controlled current sources configured to be controlled by the absolute value of the corresponding weight; and a plurality of control transistors configured to be controlled by the control signals, the plurality of control transistors being coupled between the first and second current mirrors and the plurality of current controlled current sources.

The output oscillator may include: an input low pass filter having a first terminal coupled to the 1-bit DACs; a transconductance amplifier having an input terminal coupled to a second terminal of the input low pass filter and an output terminal coupled to an accumulating node; a capacitor coupled between the accumulating node and ground; a first reset switch coupled between the accumulating node and a reset voltage; a comparator having a non-inverting input coupled to the accumulating node and an output coupled to a corresponding one of the 1-bit DACs; and a first delay including: an input coupled to the output of the comparator; and an output configured to control the first reset switch.

The convolutional circuit may further include an output low pass filter coupled to an output of the output oscillator.

Each of the spiking signals may include a plurality of pulses, wherein the spiking rate corresponds to a time between adjacent ones of the pulses.

Each of the weighted outputs may be a current.

Each of the spiking signals may include a plurality of pulses, wherein the spiking rate corresponds to a time between adjacent ones of the pulses, and wherein each of the weighted outputs has a positive current during a pulse of a corresponding spiking signal and a negative current during the time between adjacent ones of the pulses.

The analog input signals may correspond to an image.

According to one embodiment of the present invention, a method for convolving a plurality of analog input signals with a kernel represented by plurality of weights includes: converting the analog input signals to a plurality of corresponding spiking signals, each of the spiking signals having a spiking rate; supplying the spiking signals and the weights of the kernel to 1-bit DACs to generate weighted outputs; integrating the weighted outputs to generate an integrated weighted output; controlling an output oscillator based on the integrated weighted output; and generating an output spike signal from the output oscillator, the output spike signal having an output spiking rate corresponding to a convolution of the analog input signals with the kernel.

The method may further include applying a low pass filter to the output spike signal.

Each of the spiking signals may include a plurality of pulses, and the spiking rate may correspond to a time between adjacent ones of the pulses.

Each of the weighted outputs may be a current.

Each of the spiking signals may include a plurality of pulses, wherein the spiking rate corresponds to a time between adjacent ones of the pulses, and wherein each of the weighted outputs has a positive current during a pulse of a corresponding spiking signal and a negative current during the time between adjacent ones of the pulses.

The analog input signals may correspond to an image.

BRIEF DESCRIPTION OF THE DRAWINGS

The accompanying drawings, together with the specification, illustrate exemplary embodiments of the present invention, and, together with the description, serve to explain the principles of the present invention.

FIGS. 5A and 5B schematically illustrate the connections between the input oscillators, the 1-bit DACs, and the pixel values of a current patch of the input image according to one embodiment of the present invention.

FIG. 6B is a circuit diagram of a transconductance amplifier of an input oscillator according to one embodiment of the present invention.

FIG. 6C is a circuit diagram of a delay according to one embodiment of the present invention.

FIG. 6D is a circuit diagram of an input oscillator that includes two switches and two delays according to one embodiment of the present invention.

FIG. 6E is a circuit diagram of a second delay according to one embodiment of the present invention.

FIG. 13A is a test input image supplied to a chip according to one embodiment of the present invention during an experimental run.

FIG. 13B is a convolution kernel supplied a chip according to one embodiment of the present invention during an experimental run.

FIG. 13C is an ideal convolution output between the test input image of FIG. 13A and the convolution kernel of 13B.

FIG. 13D is a convolution output generated by a chip according to one embodiment of the present invention that was supplied with the test input image of FIG. 13A and the convolution kernel of FIG. 13B during an experimental run.

FIG. 13E is an error image representing the difference between the ideal output shown in FIG. 13C and the experimental output shown in FIG. 13D according to one embodiment of the present invention.

FIG. 13F is a histogram of the error for all the pixels of the second experimental output image according to one embodiment of the present invention.

DETAILED DESCRIPTION

Figure 1:
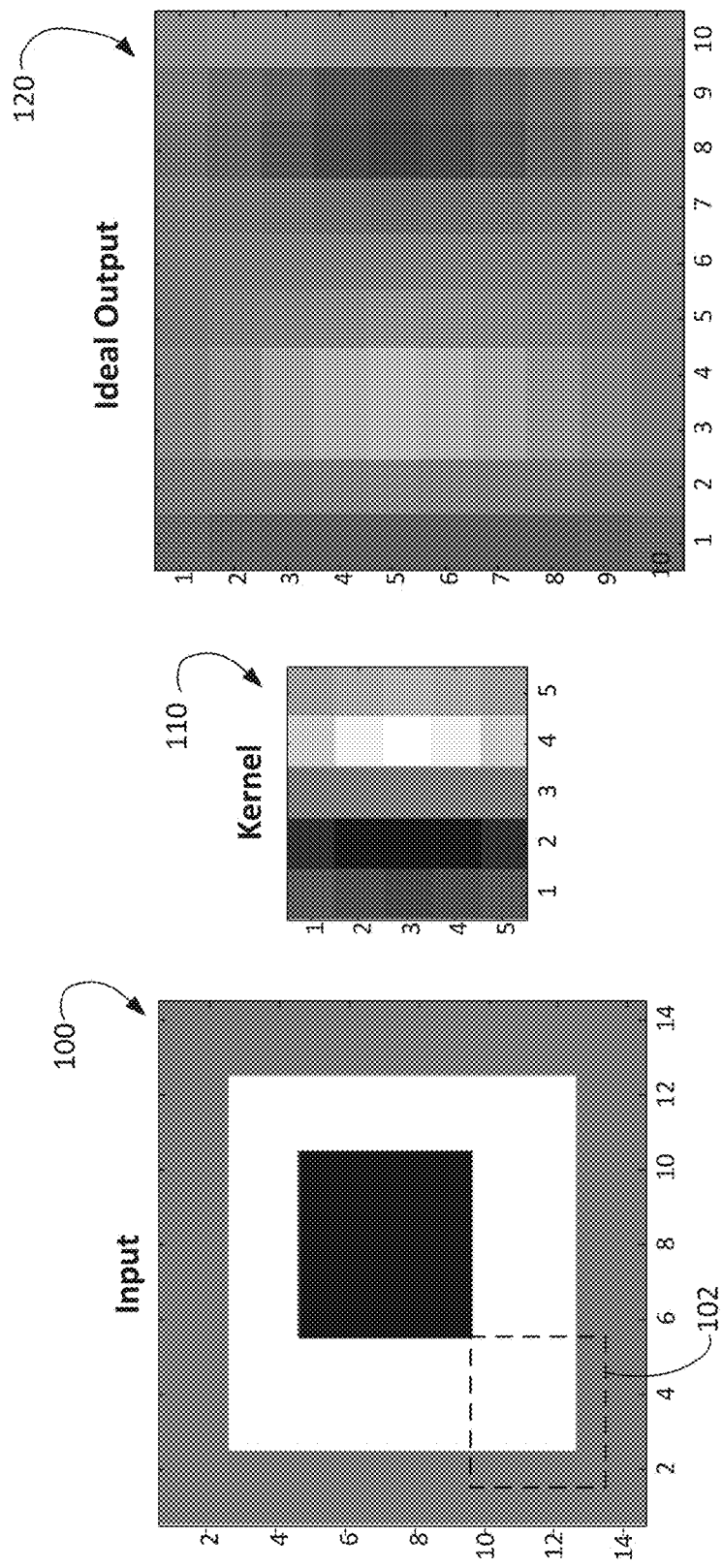
FIG. 1 is a schematic diagram illustrating the output from convolving an input image with a kernel to detect vertical edges in the input image.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As discussed above, FIG. 1 is a schematic diagram illustrating an example of generating an output image 120 of size 10 pixels by 10 pixels from convolving an input image 100 of size 14 pixels by 14 pixels with a kernel 110 of size 5 pixels by 5 pixels. The output image 120 may be generated by splitting the input image 100 into overlapping input patches 102. The values of the pixels in each of the input patches 102 are multiplied by corresponding values of the kernel 110, and the resulting products are added together to compute the value of the pixel of the output image 120 corresponding to that input patch 102. As such, generating each pixel of the output image 120 requires one multiplication operation for each pixel of the kernel 110 (in this example with a 5 pixel by 5 pixel kernel, 5×5=25 multiplication operations) along with addition operations to sum the results (in this example, there are 25 products, and therefore 25−1=24 addition operations are performed to sum these values). In practical systems, the input image, output image, and kernel may be much larger than the example shown here and the number of operations increases more than linearly with the sizes of the input image, output image, and kernel size. A general purpose microprocessor is not designed with these types of workflows in mind, and therefore will typically be configured to perform these operations one at a time (e.g., serially) in a power inefficient manner, thereby making it difficult to scale such systems for use with larger inputs and outputs.

As such, embodiments of the present invention are directed toward a circuit configured to perform the convolution operation using a reduced amount of power. In particular, embodiments of the present invention can be used for technologies with small power supplies and have higher accuracy than comparable analog circuits, using less circuitry than digital circuits. In one experimental embodiment, the core circuit uses 260 pJ per pixel and operates at 1 MHz, producing the correct convolution result with less than 2% error. In more detail, embodiments of the present invention compute a convolution using a circuit based on an input layer of spiking oscillators (or input oscillators) connected to an output layer of spiking oscillators (or output oscillators), where the connections 230 include a set of 1-bit digital to analog converters (DACs).

Circuits according to embodiments of the present invention can be used as a building block of an image processing pipeline. The signals transmitted between components are spiking pulse signals that have only two voltage levels and that are efficient for current CMOS processes with low voltage supplies. These spiking pulse signals can be transmitted using less wiring than when transmitting digital signals. For an analog spiking signal, only one wire is used to transmit information with multiple bits of resolution.

Figure 2:
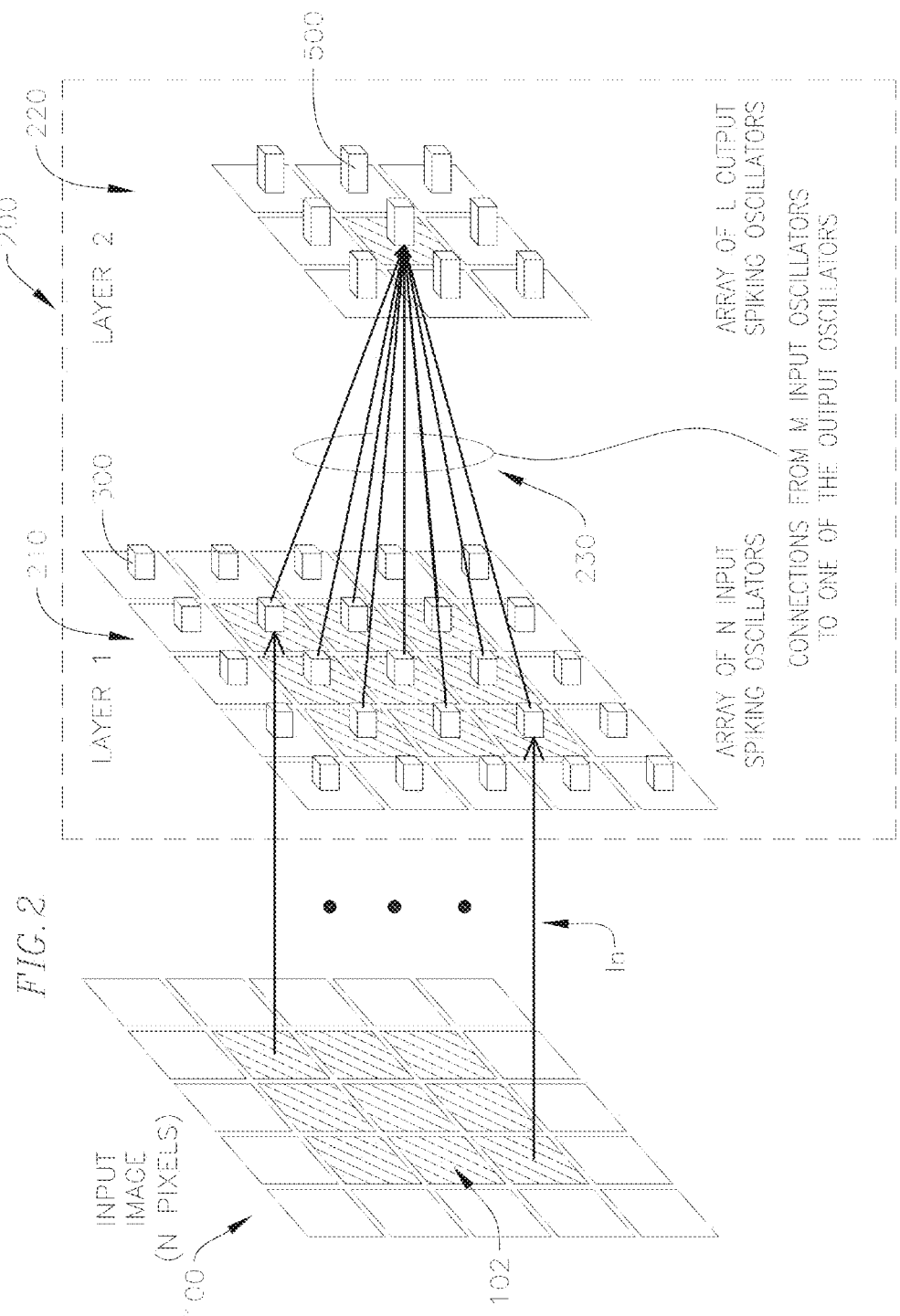
FIG. 2 is a schematic diagram illustrating an embodiment of the present invention in which two layers of spiking oscillators perform image convolution.

FIG. 2 is a schematic diagram illustrating a circuit 200 according to an embodiment of the present invention in which two layers of spiking oscillators perform image convolution of multiple patches 102 of an input image 100 in parallel. In the example shown in FIG. 2, the input layer 210 includes N input oscillators 300 (in this example, 25 input oscillators, and therefore N is 25) which receive external inputs In that correspond to the intensity of N pixels of the input image 100 and which output voltage spikes. In FIG. 2, one patch 102 of the input image 100 is shown with shaded pixels, where the patch 102 has M pixels (in this example, the patch 102 is a 3 pixel by 3 pixel portion and therefore M is 9). These external inputs In control the spiking rate of the input oscillators 300, where the spikes are voltage signals having binary amplitude. The nine input oscillators 300 associated with the patch 102 are shaded in FIG. 2. For the sake of clarity, FIG. 2 omits additional circuitry for supplying the input data to the input layer 210 and for reading out the result from the output layer 220.

The spikes generated by the N input oscillators 300 are supplied to an output oscillator 500 (or multiple output oscillators) of the output layer 220. Each of the L output oscillators receives inputs from M connections 230 (in the example shown in FIG. 2, L is 9), where each of the M connections 230 includes a 1-bit DAC which applies a corresponding weight w to the spike to generate a weighted current pulse, where the M weights correspond to the kernel 110 (in the example shown in FIG. 2, a 3 by 3 kernel is used and therefore there are 9 weights).

In more detail, each of the DACs corresponds to one of the pixels of the kernel and each DAC is programmed with a weight (w) corresponding to the intensity of the corresponding pixel of the kernel. As such, each of the DACs outputs a response based on the spikes received from the input oscillators 300 and its weight (w). A 1-bit DAC according to embodiments of the present invention is simpler to implement and more energy efficient than comparative analog multipliers (such as a Gilbert cell) or digital multipliers (such as a general purpose microprocessor).

The weighted current pulses are summed to control an output oscillator (or output spiking oscillator) 500 of the output layer 220. The signals generated by the output spiking oscillators 500 correspond to the result of convolving the input patch 102 with the kernel 110. As seen in FIG. 2, the M connections from the shaded input oscillators associated with patch 102 are all connected to the same output oscillator (e.g., the shaded center output oscillator).

In one embodiment, L is slightly smaller than or equal to N. In one embodiment, M is smaller than each of L and N. In one embodiment, the total number of connections 230 in the circuit is M×L.

For the sake of convenience, additional connections 230 between the input oscillators 300 of Layer 1 and the output oscillators 500 of Layer 2 are not shown in FIG. 2. For example, a group of nine input oscillators 300 of Layer 1 that include the first two rows of shaded oscillators and the row of three oscillators directly above may be connected through additional connections 230 (with corresponding weights) to the output oscillator 500 directly above the shaded center output oscillator shown in FIG. 2. In some embodiments, these connections 230 are substantially independent of the connections shown in FIG. 2 and the circuit may concurrently supply signals to all of the output oscillators 500 in parallel.

Figure 3:
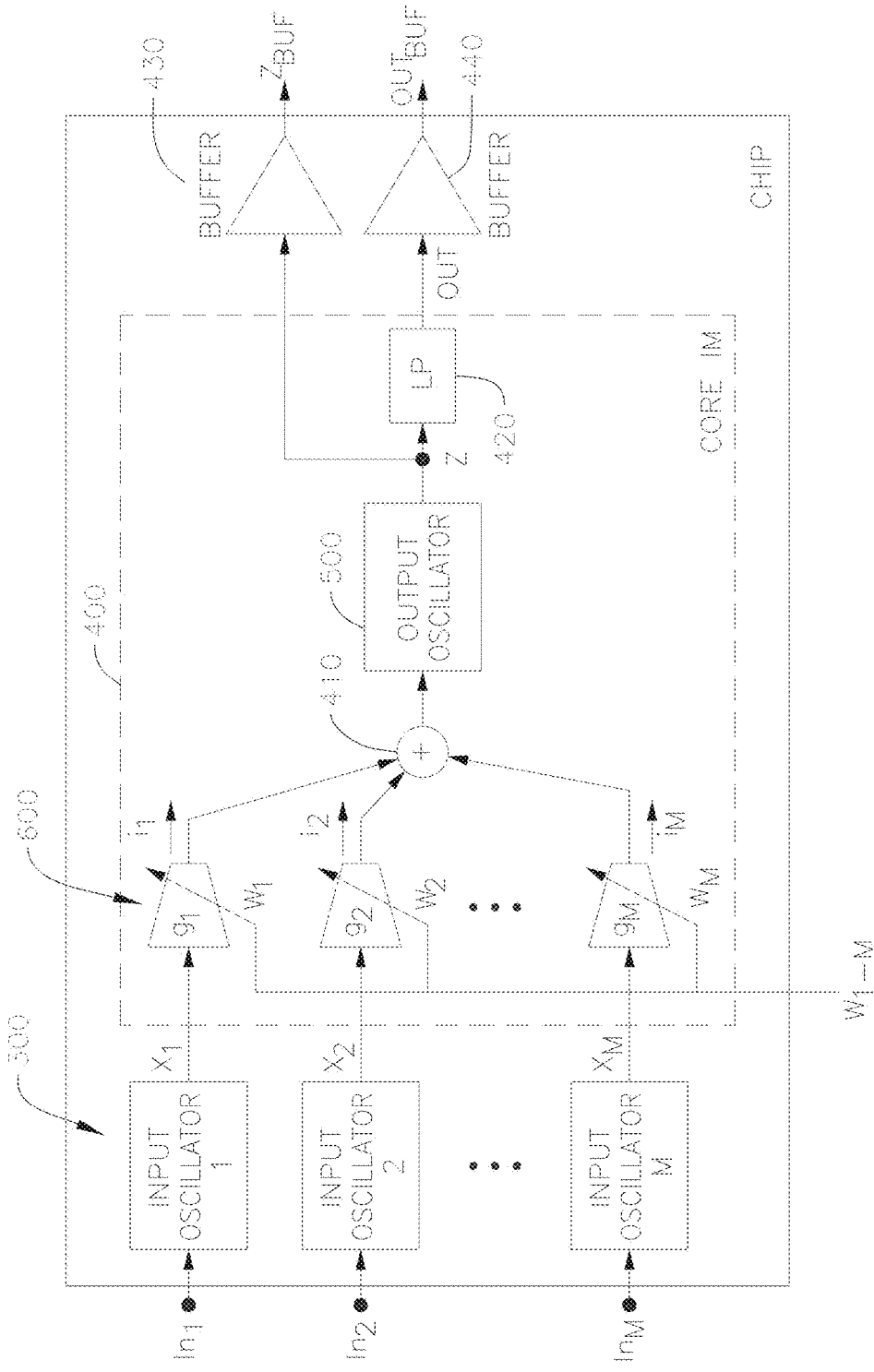
FIG. 3 is a schematic diagram of a convolution module for generating a single output pixel according to one embodiment of the present invention.

For the sake of convenience, embodiments of the present invention will be described in more detail below with respect to a convolution module 400 that includes one output oscillator 500 (e.g., where L is 1) together with a set of M 1-bit DACs 600 (as shown in FIG. 3, discussed in more detail below) receiving corresponding weights $W_{1-M}$ (weights $w_1$ through $w_M$). The circuit shown in FIG. 2 has a regular spatial structure and can be implemented, for example, using an array of N identical input oscillators 300, an array of L identical convolution modules, associated wiring, and associated input and output circuitry.

However, embodiments of the present invention are not limited thereto and, in some embodiments of the present invention, the structure described in more detail below may be adapted to control multiple output oscillators 500 in parallel. For example, multiple groups of M 1-bit DACs 600 may be used in parallel and the groups of 1-bit DACs may be coupled to different ones of the output oscillators.

FIG. 3 is a schematic diagram of a convolution module 400 for generating a single output pixel according to one embodiment of the present invention. As shown in FIG. 3, input oscillators 300 receive input signals In corresponding to the values of the input image 100 and supply spiking signals x to corresponding ones of the 1-bit DACs 600.

Figures 4A, 4B:
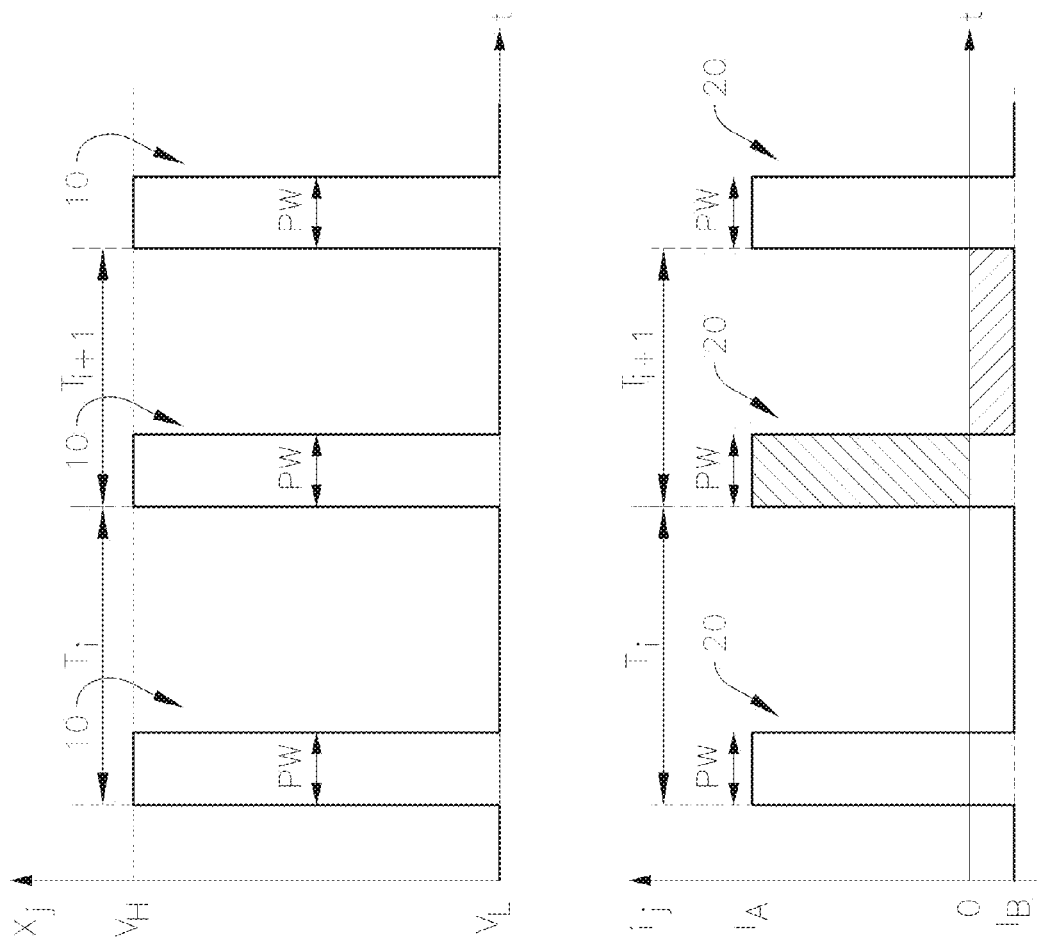
FIG. 4A illustrates a waveform of the spiking signals generated by an input oscillator according to one embodiment of the present invention.
FIG. 4B illustrates a waveform of the current pulses generated by the 1-bit DACs according to one embodiment of the present invention.

FIG. 4A illustrates a waveform of a j-th spiking signal $x_j$ of the spiking signals x generated by a j-th input oscillator 300j in response to a j-th input according to one embodiment of the present invention. As seen in FIG. 4A, the waveform is binary valued, having voltage $V_L$ or $V_H$. Each of the spikes 10 of the j-th spiking signal $x_j$ has voltage $V_H$ and a pulse width PW (the pulse width may be set to be a particular value based on, for example, noise characteristics of the circuit). The signal In supplied to the input oscillator 300j controls the length of the period T between adjacent pulses (example circuits for implementing the input oscillator 300j will be discussed in more detail below). A higher input signal In results in a shorter period T In the example shown in FIG. 4A, the input signal In increased over time t, and therefore the later period $T_{i+1}$ is shorter than the earlier period $T_i$.

In response, the 1-bit DACs 600 supply weighted current pulses i to a summing node 410, which controls the spiking rate of its corresponding output oscillator 500. FIG. 3 shows the M input oscillators (from among the N total input oscillators 300) that are coupled to a single output oscillator 500 via the M connections 230. As such, the input signals In are labeled $In_1, In_2, \ldots, In_M$, the spiking signals x produced by the input oscillators are labeled $x_1, x_2, \ldots, x_M$, and the weighted current pulses (or weighted outputs) are labeled $i_1, i_2, \ldots, i_M$.

In more detail, each of the 1-bit DACs 600 receives a spiking signal x from a corresponding one of the input oscillators 300 along with a weight w from among M weights W corresponding to the kernel. Each of the M 1-bit DACs 600 produces a corresponding current pulse signal i (e.g., M current pulse signals $i_1, i_2, \ldots, i_M$), where the spike rate of the current pulses is controlled by the rate of the spiking signal x (e.g., the rate at which the spikes 10 arrive) and the amplitudes of the current pulses is controlled by the value of the weight w.

As such, the 1-bit DACs 600 effectively compute the product of the input signal (as encoded in the spike rate of the spiking signal x) and the weight w and therefore implement the multiplication operations of the convolution between the input image and the kernel.

In addition, because the weighted outputs of the 1-bit DACs are currents, supplying these output currents to the common summing node 410 has the effect of summing the output currents due to Kirchhoff's current law. As such, embodiments of the present invention can sum the weighted contributions of the input signal weighted by the kernel without the M−1 addition operations that would be used in a comparative system.

FIG. 4B illustrates a waveform of one of the current pulse signals generated by the 1-bit DACs 600 according to one embodiment of the present invention. In particular, FIG. 4B illustrates the current pulse signal $i_j$ generated by the j-th 1-bit DAC $g_j$ in response to the j-th spiking signal $x_j$. As seen in FIG. 4B, the pulses 20 of the current pulse signal $i_j$ have the same pulse width PW as the spiking signal $x_j$ and the same periods $T_i$ and $T_{i+1}$ between pulses. During a pulse 20 of the current pulse signal i (e.g., while i is non-zero), the magnitude of the current is $I_A$ and between pulses (e.g., while i is 0), the magnitude of the current is $I_B$ (as seen in FIG. 4B, $I_A$ is a positive current and $I_B$ is a negative current, but embodiments of the present invention are not limited thereto), where $I_A$ and $I_B$ are defined as:

$$I_A = \alpha \cdot w_j$$

$$I_B = \beta \cdot w_j$$

where α and β are constants and where, in one embodiment, β=−0.25α. The shaded area in the pulse corresponds to the total charge associated with the pulse or the total charge associated with the period between pulses.

The current pulse signals i are summed together at a summing node 410, which can be a simple wire connection of the outputs of the 1-bit DACs 600 (e.g., due to Kirchhoff's current law). As described in more detail below, the summing node 410 may be coupled to a capacitor which sums the charge from weighted pulse signals i from the 1-bit DACs 600. As such, the accumulation of the charge from the weighted pulse signals i corresponds to the summing of the products in the convolution function. The summed voltage at the summing node 410 is used to control the spiking rate of output oscillator 500, which generates an output spike signal z. The spiking rate (or spiking frequency) of the output spike signal z corresponds to the result of the convolution operation. An output low pass filter 420 may be used to calculate an analog signal with the average of the spike signal z (e.g., an average value of the spike signal z over a time window).

In some embodiments of the present invention, an asynchronous digital buffer 430 (e.g., a chain of inventers) may be used to output the spike signal z. In some embodiments of the present invention, an analog output buffer 440 (e.g., an operational amplifier) may be used to output the analog signal from the output low pass filter 420.

As noted above, FIG. 3 illustrates a convolution module 400 computing the convolution for one output pixel of the output image based on a patch of pixels of the input image. According to one embodiment of the present invention, the circuit 200 includes a single convolution module 400, and where computing the convolution of the input image with the kernel includes supplying the values of the pixels of the patches of the input image to the convolution module 400 one patch at a time to generate values of the output image, one output image pixel at a time.

Figure 5A:
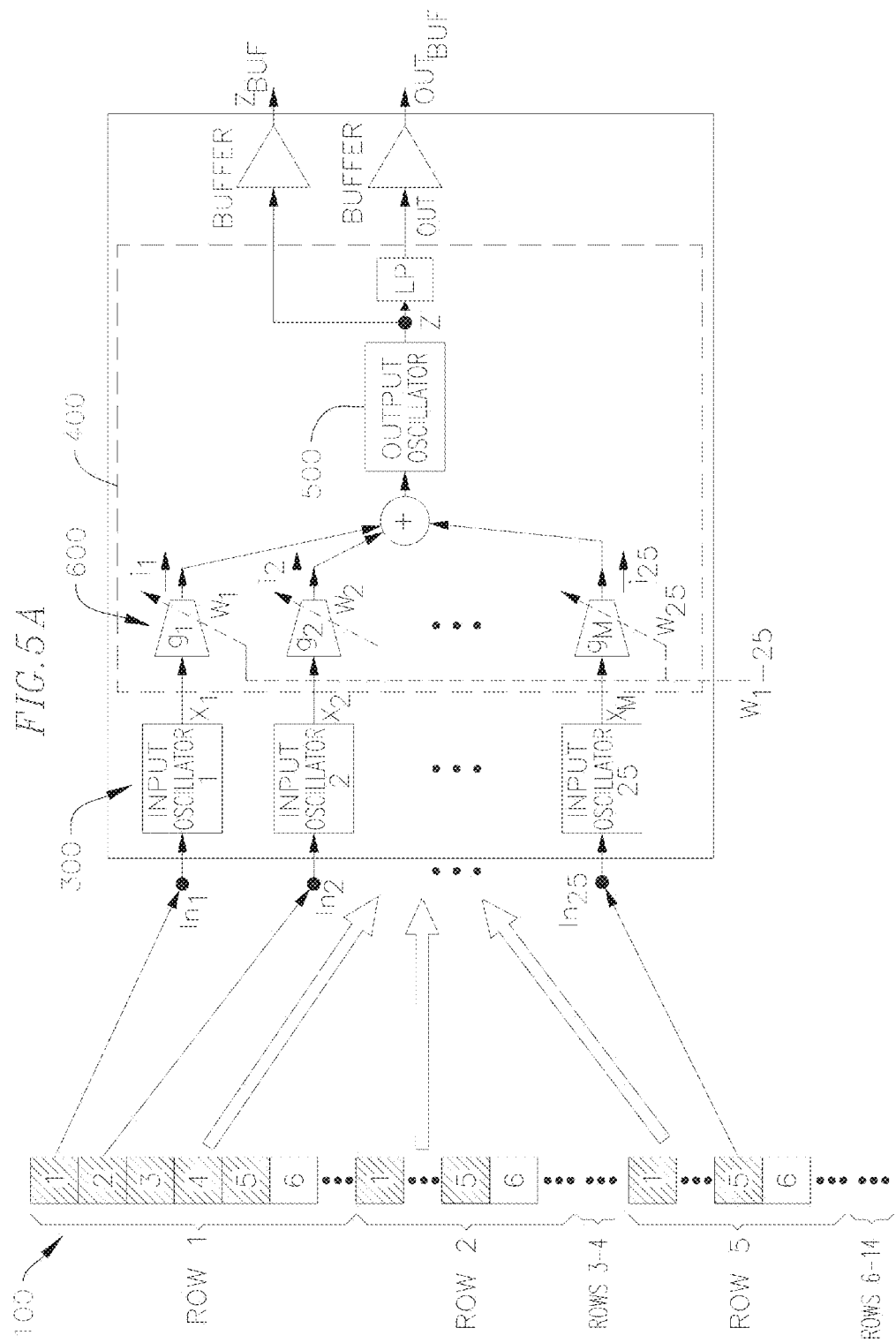

FIGS. 5A and 5B schematically illustrate the connections the input oscillators 300, the 1-bit DACs 600, and the pixel values of two different patches of the input image 100 according to one embodiment of the present invention. In the example shown in FIG. 5A, sizes of the input image 100, kernel image, and output image are 14 pixels by 14 pixels (14×14), 5 pixels by 5 pixels (5×5), and 10 pixels by 10 pixels (10×10), respectively (the same sizes as those of the example of FIG. 1). However, embodiments of the present invention are not limited thereto. As seen in FIG. 5A, the 196 pixels of the 14×14 input image are "unrolled" into a single column (or vector or column vector) of values, grouped by row. In addition, as seen in FIG. 5A, a first patch including pixels 1 through 5 of rows 1 through 5 of the input pixels (as denoted by the pixels highlighted in black) are supplied to the 1-bit DACs (via the input oscillators) in order to compute the convolution of the first patch with the kernel (represented by the weights $w_{1-25}$).

FIG. 5B is substantially similar to FIG. 5A, with the difference that it illustrates a second patch of the input image 100 being supplied to the 1-bit DACs 600. In particular, the second patch includes pixels 2 through 6 of rows 1 through 5 (as denoted by the pixels highlighted in black) are supplied to the 1-bit DACs 600 via input oscillators 300 to compute the convolution of the second patch with the kernel.

According to another embodiment of the present invention, multiple convolution modules 400 may operate in parallel to compute convolutions of different patches of the input image in parallel. For example, if there were two convolution modules, then one convolution module may be used to process patches from the upper half of the image and the other convolution module may be used to process patches from the lower half of the image. Similarly, if there were three or four convolution modules, each may be used to process patches from separate portions of the image. Furthermore, in some embodiments, there are sufficient convolution modules such that each output pixel can be calculated from corresponding patches of the input image in parallel.

Figure 6A:
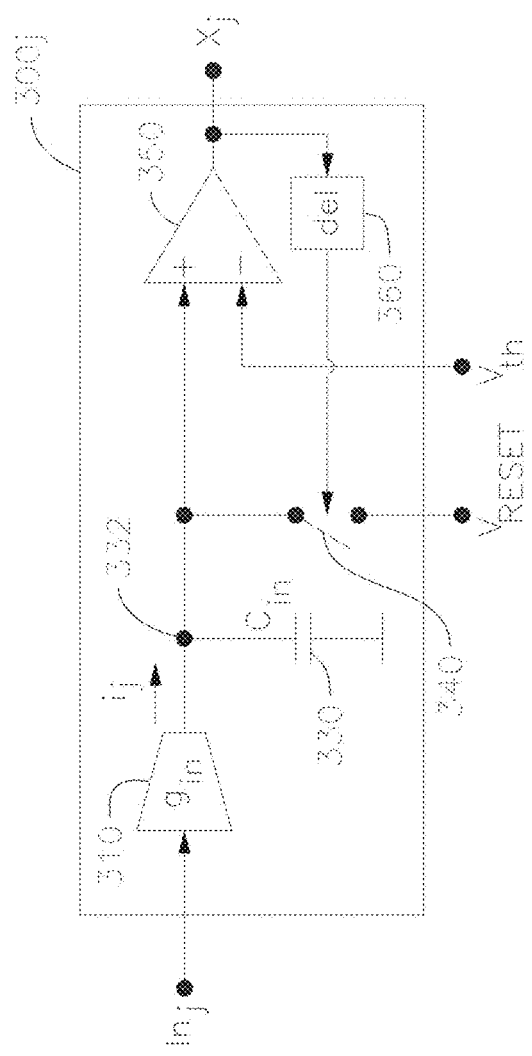
FIG. 6A is a circuit diagram of an input oscillator according to one embodiment of the present invention.

FIG. 6A is a schematic diagram of an input oscillator 300 (e.g., j-th input oscillator 300j) according to one embodiment of the present invention. As shown in FIG. 6A, the input oscillator 300 includes a transconductance amplifier ($g_m$) 310, a capacitor 330, a switch 340, a comparator 350, and a delay element 360. The transconductance amplifier 310 receives an input signal $In_j$ from the input image (e.g., an analog value corresponding to the value of the pixel of the input image) and has an output terminal coupled to an accumulating node 332. The accumulating node 332 is coupled to the non-inverting input of the comparator 350. In addition, the capacitor 330 is coupled between the accumulating node 332 and ground, and the switch 340 is coupled between the accumulating node 332 and ground, in parallel with the capacitor 330. The inverting input of the comparator 350 is supplied with a threshold voltage $V_{th}$ (e.g., a constant voltage higher than ground), and the output of the comparator 350 is coupled to the delay 360, which controls the operation of the switch 340. The switch 340 is maintained in an open state (an "off" state) until triggered by a signal from the delay 360.

When the transconductance amplifier 310 receives the input signal $In_j$, it outputs a current $i_{input,j}$ to the accumulating node 332. The transconductance amplifier 310 produces a positive current whose value depends on the voltage of the input signal $In_j$. Larger currents $i_{input,j}$ are generated when the voltage of the input signal $In_j$ is higher.

The current $i_{input,j}$ is accumulated in the capacitor 330, which has a capacitance $C_{in}$ and which acts as an integrator. As charge accumulates in the capacitor 330, the voltage at the accumulating node 332 increases (e.g., monotonically), where the rate of increase depends on the amplitude of the input signal $In_j$. When the voltage at the accumulating node 332 exceeds the threshold voltage $V_{th}$, the comparator 350 is triggered and begins to output a positive pulse having the high voltage $V_H$. The high voltage $V_H$ output of the comparator 350 triggers the delay 360. When the output of the delay 360 goes high, it causes the switch 340 to close, thereby resetting the capacitor 330 and pulling the voltage of the accumulating node 332 to ground. Pulling the voltage of the accumulating node 332 to ground has the effect of ending the positive pulse because the voltage at the non-inverting input has fallen below the threshold voltage $V_{th}$ so that the comparator 350, instead, begins to output the low voltage $V_L$ until the voltage at the accumulating node 332 again exceeds the threshold voltage $V_{th}$. As such, the delay 360 controls the pulse width PW of the signal (see FIG. 4A) and the magnitude of the input signal $In_j$ controls the period T between spikes 10 of the output $x_j$. In some embodiments, the pulse rates are in the range from 10 MHz to 40 MHz.

FIG. 6B is a schematic diagram of a transconductance amplifier 310 of an input oscillator 300 (e.g., the j-th input oscillator 300j) according to one embodiment of the present invention. As seen in FIG. 6B, according to one embodiment of the present invention, the transconductance amplifier 310 includes three transistors. A first transistor M3 of the transconductance amplifier 310 is an N-type (or N-channel) MOSFET having a first electrode coupled to a node 312, a second electrode coupled to ground, and a gate electrode coupled to the input 314 to receive input signal $In_j$. A second transistor M4 of the transconductance amplifier 310 is a P-type (or P-channel) MOSFET having a first electrode coupled to a voltage source 316, a second electrode coupled to the node 312, and a gate electrode coupled to the node 312. A third transistor M5 of the transconductance amplifier 310 is a P-type MOSFET with a first electrode coupled to the voltage source 316, a second electrode coupled to the accumulating node 332, and a gate electrode coupled to the node 312.

FIG. 6C is a schematic diagram of a delay 360 according to one embodiment of the present invention. As shown in FIG. 6C, the delay 360 includes four transistors which make up two inverters 362 and 364. A first P-type transistor M9a of the first inverter has a first electrode coupled to a voltage source 316, a second electrode coupled to an internal node 366, and a gate electrode coupled to the output of the comparator 350. A first N-type transistor M10a of the first inverter has a first electrode coupled to the internal node 366, a second electrode coupled to ground, and gate electrode coupled to the output of the comparator 350. The first P-type transistor M9a and the first N-type transistor M10a together form the first inverter 362. A second P-type transistor M9b of the delay has a first electrode coupled to the voltage source 316, a second electrode coupled to the switch 340 via output node 360, and a gate electrode coupled to the internal node 366. A second N-type transistor M10b of the delay has a first electrode coupled to the switch 340 via output node 369, a second electrode coupled to ground, and a gate electrode coupled to the internal node 366. The second P-type transistor M9b and the second N-type transistor M10b together make up a second inverter 364.

FIG. 6D is a schematic diagram of an input oscillator 300j' that includes two switches and two delays 360 and 380 (e.g., a first delay and a second delay, respectively) according to one embodiment of the present invention. FIG. 6B is substantially similar to the input oscillator 300j of FIG. 6A except for the addition of a second delay 380 and a second switch 342. The second delay 380 may be used to tune the pulse width PW of the input oscillator 300j', because the pulse width is determined by the maximum of the two delays produced by the first and second delay elements 360 and 380.

FIG. 6E is a schematic diagram of the second delay 380 according to one embodiment of the present invention. As shown in FIG. 6E, the second delay 380 includes five transistors making up a first inverter 382 and a second inverter 384. The second inverter 384 of the second delay 380 includes two of the five transistors of the second delay (transistors M9c and M10c) and is substantially the same as the second inverter 364 of the first delay 360 shown in FIG. 6C and therefore discussion of the second inverter 384 of the second delay 380 will not be repeated herein.

The first inverter 382 of the second delay 380 includes the remaining three transistors of the second delay 380. A P-type transistor M6 of the first inverter has a first electrode coupled to a voltage source 316, a second electrode coupled to an internal node 386, and a gate electrode coupled to the output of the comparator 350. A first N-type transistor M7 of the first inverter has a first electrode and a gate electrode, both of which are coupled to the internal node. A second N-type transistor M8 of the first inverter has a first electrode coupled to the second electrode of the first N-type transistor, a second electrode coupled to ground, and a gate electrode coupled to a line supplying a bias voltage $V_b$. The bias voltage $V_b$ may be used to tune the speed of operation of the inverter, thereby controlling the timing of the inverter, and allowing control over the pulse width of the pulses generated by the input oscillator 300j'.

Figure 7:
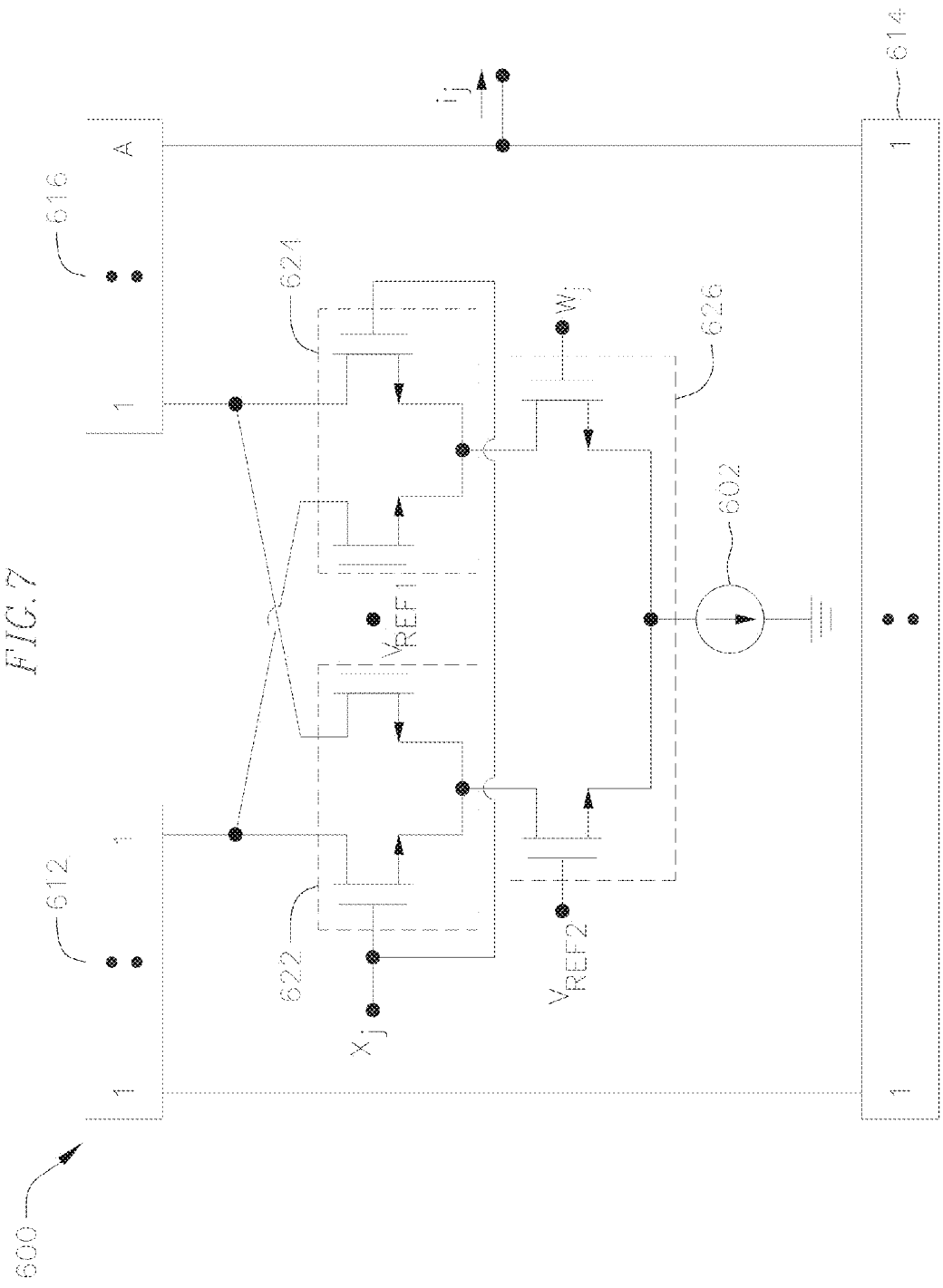
FIG. 7 is a circuit diagram of 1-bit DAC according to one embodiment of the present invention.

FIG. 7 is a circuit diagram of 1-bit DAC 600 according to one embodiment of the present invention. As shown in FIG. 7, the 1-bit DAC 600 includes a current source 602, three differential pairs of transistors, and three current mirrors 612, 614, and 616, where the first and second current mirrors 612 and 614 have a current gain of 1 and the third current mirror 616 has a current gain of A. The first current mirror 612 is coupled to the second current mirror 614 and the third current mirror 616 is coupled to the second current mirror 614. The transistors in the top two differential pairs 622 and 624 are used as switches, a first reference voltage $V_{ref1}$ is supplied to the gate electrodes between the top two differential pairs, and the pulse input $x_j$ is supplied to the other gate electrodes of the top two differential pairs 622 and 624. The top differential pairs 622 and 624 are both coupled to the first and third current mirrors 612 and 616. The bottom differential pair 626 is coupled between the bottoms of the top two differential pairs 622 and 624 and the current source 602. A second reference voltage $V_{ref2}$ is supplied to one of the gate electrodes of the bottom differential pair 626 and the weight $w_j$ is supplied to the other gate electrode of the bottom differential pair 626. The output corresponding to $i_j$ is taken between the third current mirror 616 and the second current mirror 614.

Figure 8B:
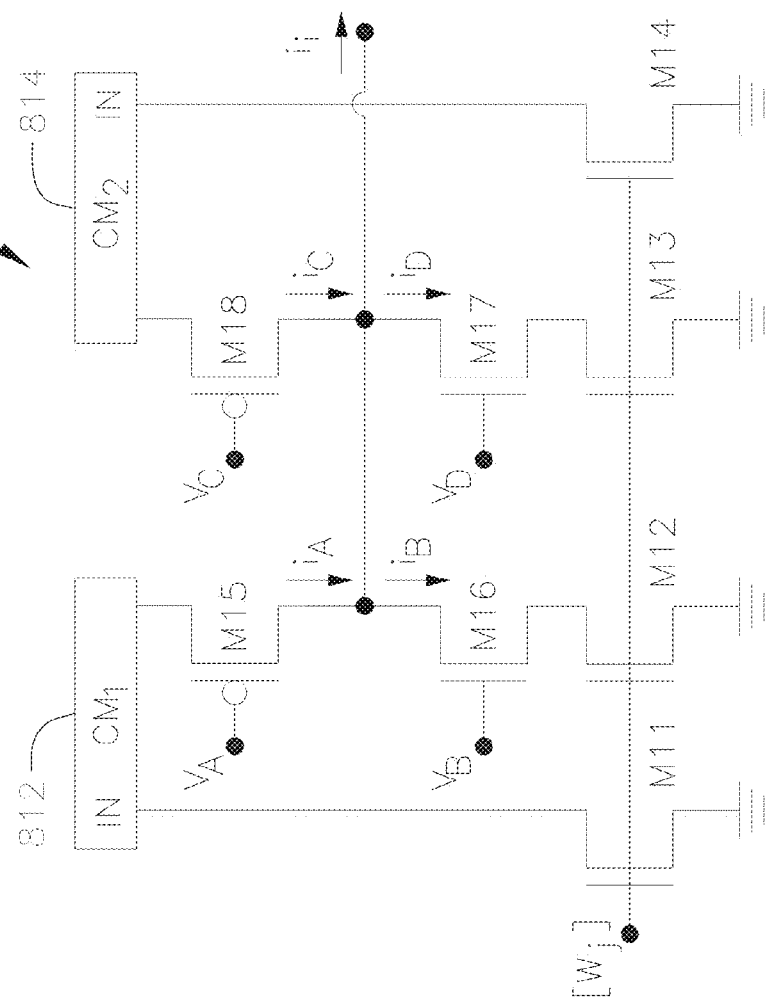
FIG. 8B is a circuit diagram of a DAC core according to one embodiment of the present invention.
Figure 8A:
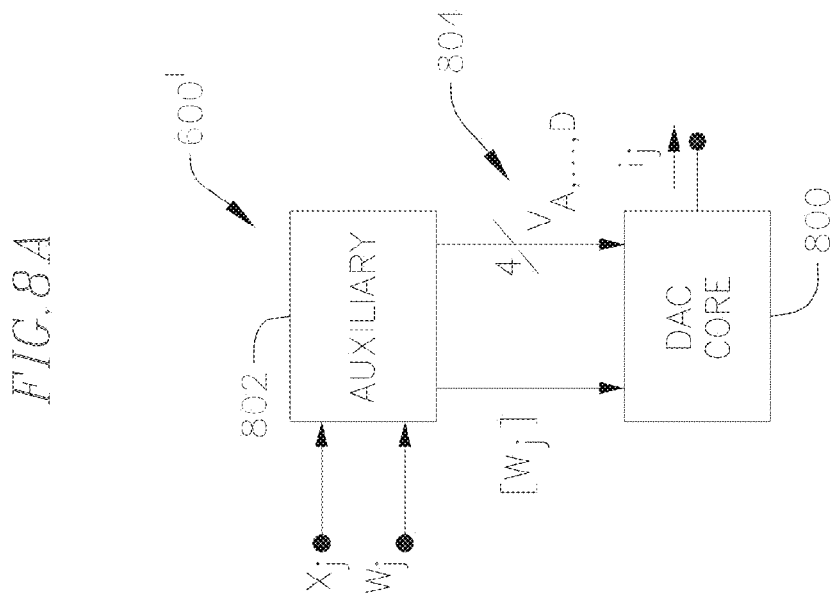
FIG. 8A is a schematic diagram of a 1-bit DAC according to one embodiment of the present invention.

FIG. 8A is a schematic diagram of a 1-bit DAC 600' according to one embodiment of the present invention. As shown in FIG. 8A, the 1-bit DAC 600' in one embodiment includes a DAC core 800 and an auxiliary module 802. The auxiliary module 802 takes the pulse input $x_j$ from the input oscillator and the weight $w_j$ to produce a set of signals 804, including $|w_j|$ (the absolute value of the weight $w_j$) and control signals $V_A$, $V_B$, $V_C$, and $V_D$ (denoted as $V_A, \ldots, V_D$ in FIG. 8A). The control signals $V_A$, $V_B$, $V_C$, and $V_D$ are binary signals having value corresponding to one of the four combinations of the logic value of the input $x_j$ (high $V_H$ or low $V_L$) and the sign (positive or negative) of the weight w. For a given input and weight, only one of the four signals $V_A$, $V_B$, $V_C$, and $V_D$ will be in the ON state. The four control signals may be generated by logic circuitry in the auxiliary module 802.

The control signals generated by the auxiliary module 802 are supplied to the DAC core circuit 800, which generates the current pulse output $i_j$ in response.

FIG. 8B is a circuit diagram of a DAC core 800 according to one embodiment of the present invention. As shown in FIG. 8B, the DAC core 800 includes four voltage-controlled current sources implemented by transistors M11, M12, M13, and M14 and current mirrors CM1 and CM2 controlled by the weight signal $|w_j|$. Control transistors M15, M16, M17, and M18 are used to implement the switches at the outputs of the four current sources and are controlled by the signals $V_A$, $V_B$, $V_C$, and $V_D$ such that, at any given time, only one of the switches is turned on.

Figure 9A:
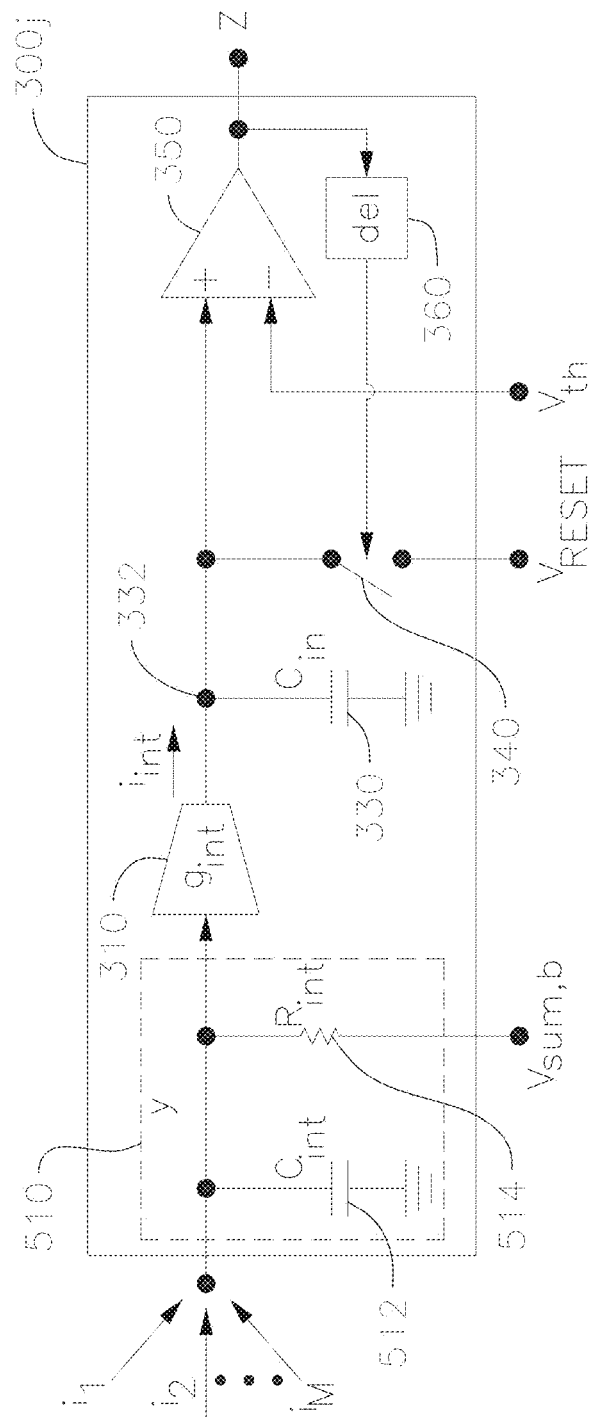
FIG. 9A is a circuit diagram of an output oscillator circuit according to one embodiment of the present invention.

FIG. 9A is a circuit diagram of an output oscillator circuit 500 according to one embodiment of the present invention. The output oscillator circuit 500 is substantially similar to the input oscillator circuit 300j, with the exception of a summing node 410 and an input low pass filter 510 located in front of the transconductance amplifier 310. Therefore, description of substantially similar components will not be repeated herein. The summing node 410 is coupled to the M 1-bit DACs 600 coupled to this output oscillator circuit 500 and may be implement using a simple wire merging. The low pass filter 510 includes an integration capacitor 512 having capacitance $C_{int}$ and coupled between the summing node 410 and ground. In some embodiments, the low pass filter includes a resistor 514 having resistance $R_{int}$ and coupled between the summing node 410 and a bias voltage source $V_{sum,b}$.

Figure 9B:
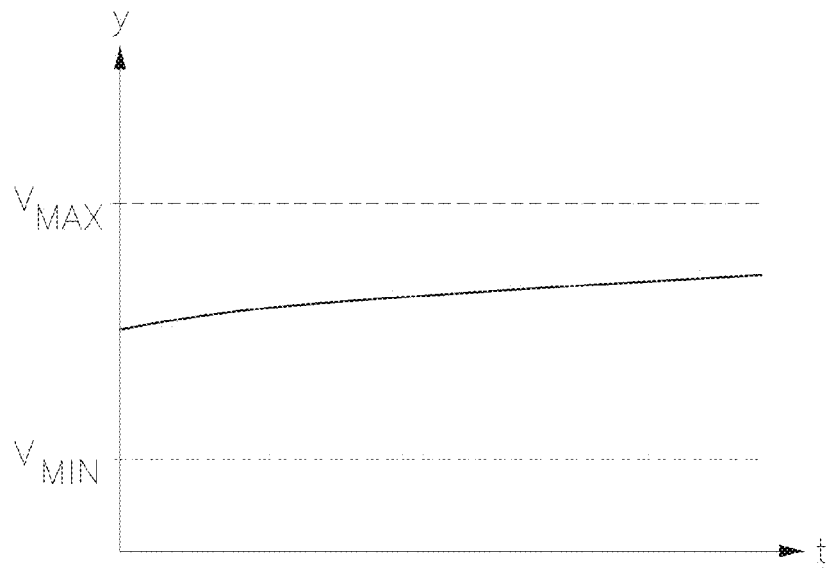
FIG. 9B is a waveform diagram illustrating a typical waveform at the summing node according to one embodiment of the present invention.

FIG. 9B is a waveform diagram illustrating a typical waveform at the summing node 410 according to one embodiment of the present invention. As seen in FIG. 9B, the waveform at the summing node 410 is an analog signal having an amplitude that depends on the areas of the pulses in the incoming currents $i_1, i_2, \ldots, i_M$. When the input currents have large positive values (as opposed to negative values), then the voltage at the summing node increases. The resistor 514 may be used to provide "leakiness" in order to drain the capacitor 512 so that the accumulated values do not become too large. In another embodiment of the present invention a switch is used in parallel with the capacitor instead of (or along with) the resistor 514. The switch in such embodiments acts as a reset switch in a similar manner to the switch 340 coupled in parallel with the capacitor 330 coupled to the accumulating node 332 internal to the oscillator.

Figure 9C:
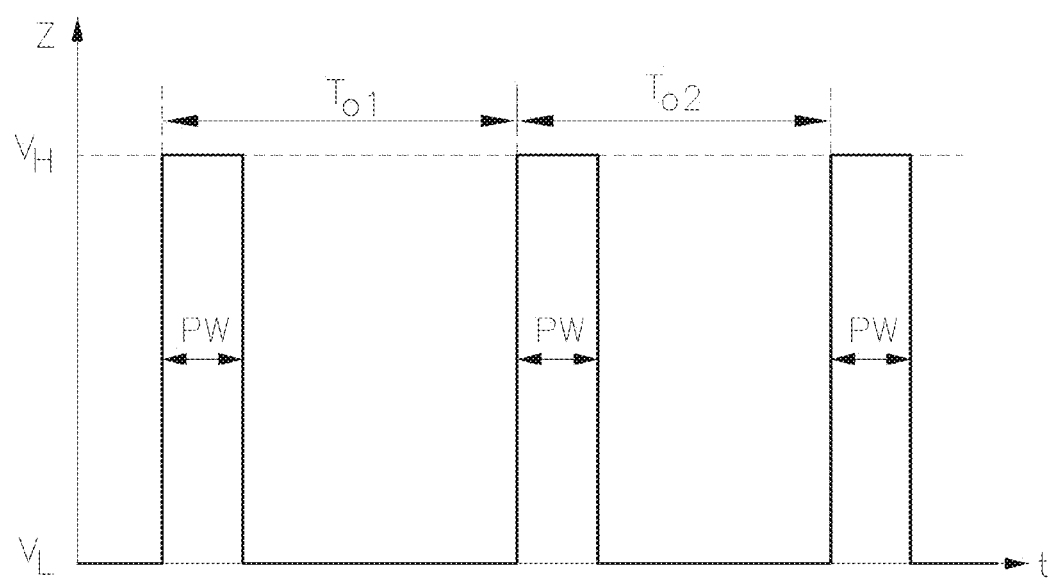
FIG. 9C is a waveform diagram illustrating an output waveform from the output oscillator according to one embodiment of the present invention.

FIG. 9C is a waveform diagram illustrating an output waveform from the output oscillator 500 according to one embodiment of the present invention. As seen in FIG. 9C, the output waveform z is a pulse type signal having the same amplitude ($V_H$) and pulse width (PW) as the input oscillators 300. The cycle times ($T_{o1}, T_{o2}, \ldots$) encode the value of the signal (e.g., the voltage) at the summing node 410. Larger voltages at the summing node 410 result in shorter cycle times $T_o$ and smaller voltages at the summing node 410 result in longer cycle times $T_o$.

As discussed above with respect to FIG. 3, the resulting output pulses z may be supplied to an asynchronous digital buffer 430 to output the spike signal z. Alternatively (or in addition), the resulting output pulses z may be supplied to an output low pass filter 420 to integrate the pulses to generate an analog signal, which can then be buffered by an analog output buffer 440 (e.g., by an operational amplifier).

Simulated Results

Figure 10:
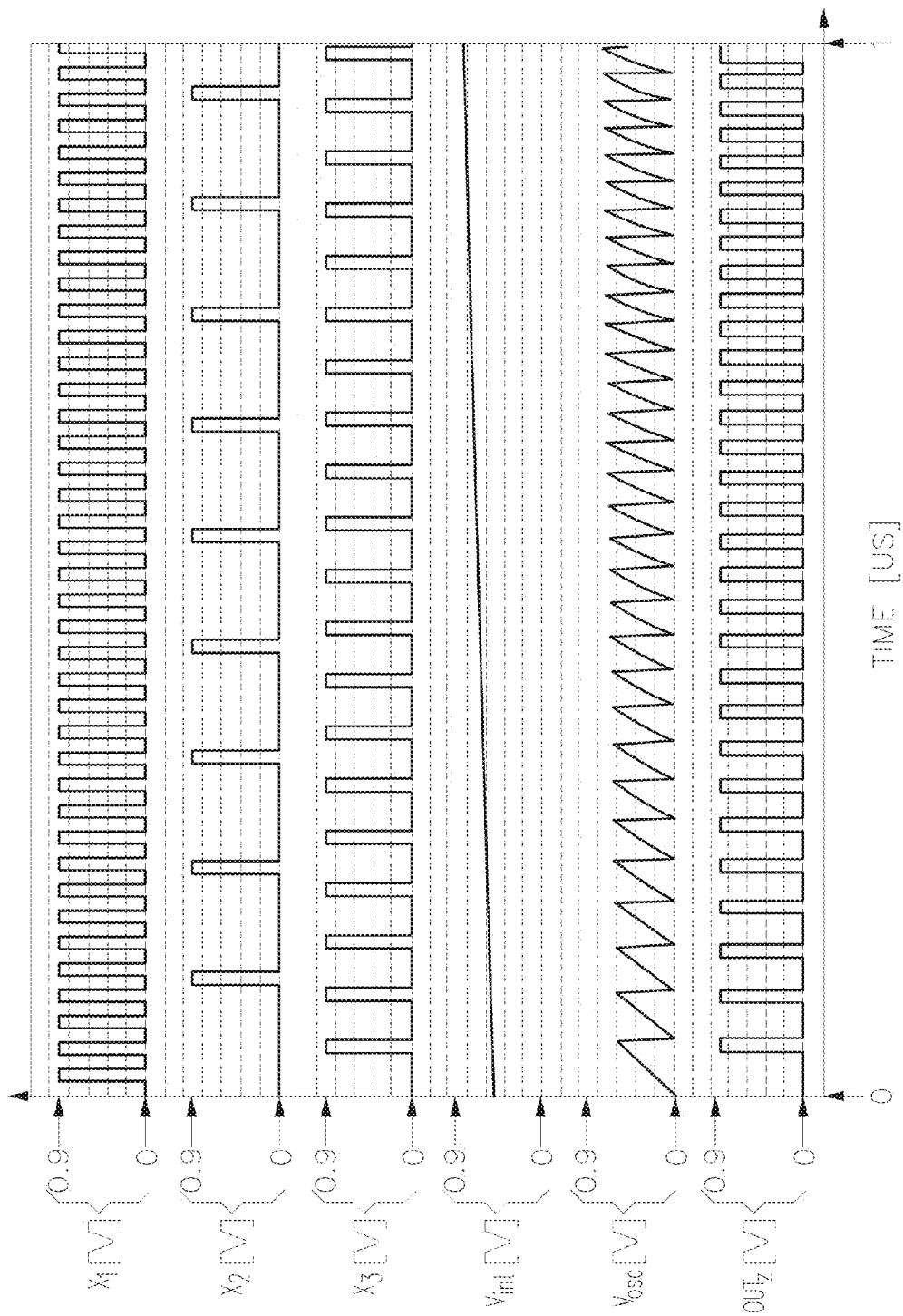
FIG. 10 is a set of waveform diagrams illustrating the waveforms at the output of three input oscillators, at the summing node, at the internal capacitor of the output oscillator, and at the output of the output oscillator in a simulation of a circuit according to one embodiment of the present invention.

FIG. 10 is a set of waveform diagrams illustrating the waveforms at the output of three input oscillators $300_1$, $300_2$, and $300_3$, at the summing node 410, at the internal capacitor 332 of the output oscillator 500, and at the output (z) of the output oscillator 500 in a simulation of a circuit according to one embodiment of the present invention. The waveforms show 1 μs of operation. The traces labeled $x_1, x_2,$ and $x_3$ show the signals produced by three of the input oscillators $300_1, 300_2,$ and $300_3$ (at high, low, and medium spike rates, respectively), the trace labeled $v_{int}$ shows the signal produced at the summing node 410 (which was reset at time 0 to a fixed value), the trace labeled $V_{osc}$ shows the signal produced at the internal node of the output oscillator 500 (e.g., at the non-inverting input of the comparator 350), and the trace labeled $Out_z$ shows the output spike signal of the output oscillator 500. The Out trace contains the convolution value.

The simulated power consumed by the circuit is 1.86 mW, and the simulated power of the major subcomponents include: 0.26 mW for a single convolution module, 1.03 mW for an array of twenty-five input oscillators, and 0.57 mW for the output buffer.

Figure 11:
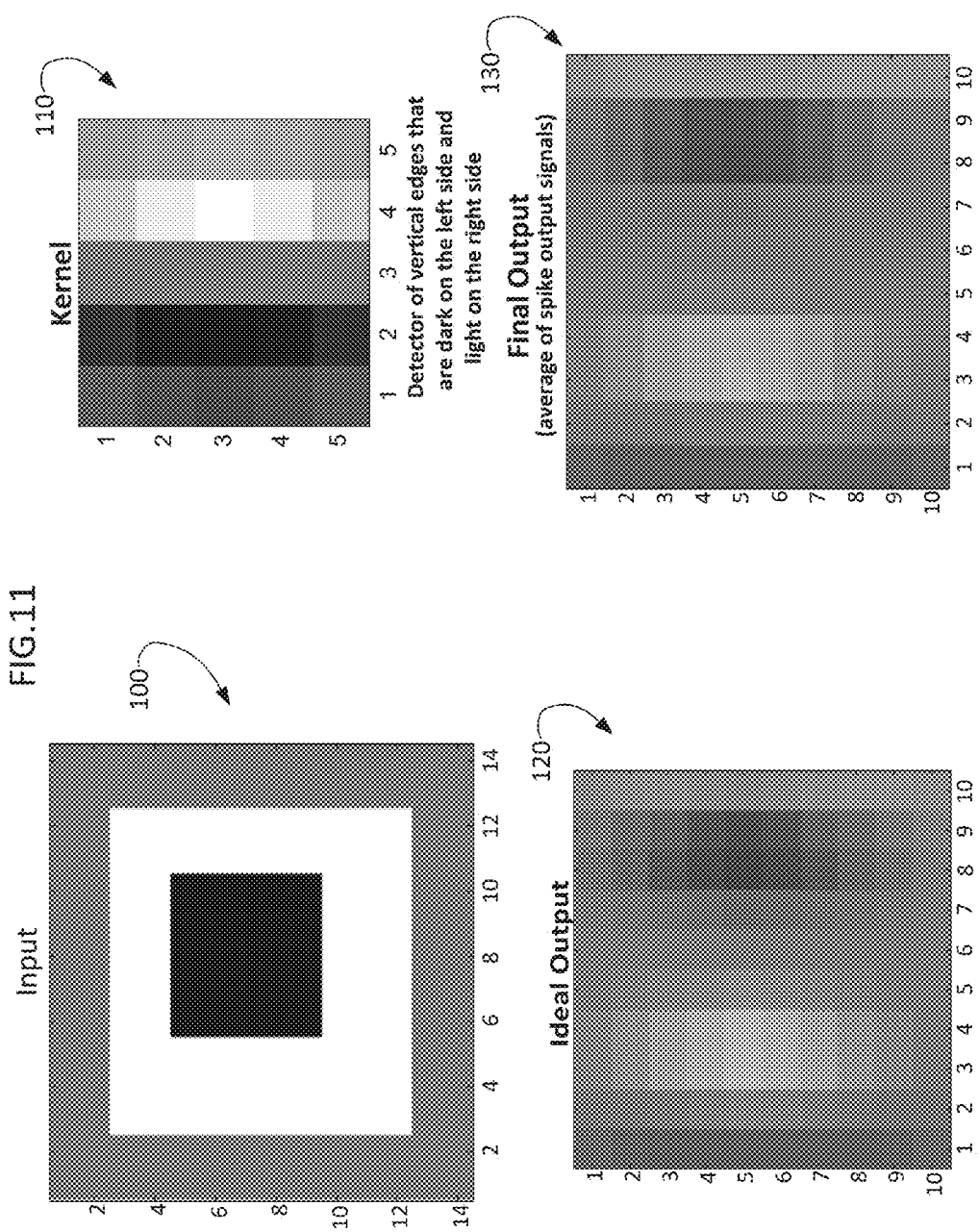
FIG. 11 is a schematic diagram illustrating the simulated output of a circuit according to one embodiment of the present invention.

FIG. 11 is a schematic diagram illustrating the simulated output of a circuit according to one embodiment of the present invention. FIG. 11 is substantially similar to FIG. 1, but further includes an image of the final output image 130 of the circuit 200. As can be seen, the final output 130 closely matches the ideal output 120, thereby confirming that the circuit design performs as intended.

Experimental Results

A chip based on the circuit design described above was fabricated on a 90 nm process. The fabricated chip includes twenty-five input oscillators, twenty-five 1-bit DACs, and one output oscillator. The twenty-five input oscillators convert twenty-five analog input signals into twenty-five pulse signals. The fabricated chip occupies 2.3 mm×2.3 mm and has seventy-two pads: twenty-five pads corresponding to the twenty-five analog inputs and an additional twenty-five pads to supply the analog weights W to the 1-bit DACs.

In one experiment, an input image of size 14×14 pixels was supplied to the chip for processing. The values of the intensities of one patch of the input image, with size 5×5 pixels, were provided to the chip via the twenty-five analog input pads. Concurrently, the weights W of the kernel 5×5 pixel kernel were supplied to the chip via the twenty-five analog weight pads. Each input patch was applied to the chip for 1 μs and the resulting output was recorded. To process the entire image, the patch was sequentially shifted across the input image (e.g., one pixel at a time from left to right in each row and repeating for all rows from top to bottom). For this image example, one hundred patches were sequentially supplied to the chip to process the entire input image.

Figure 12:
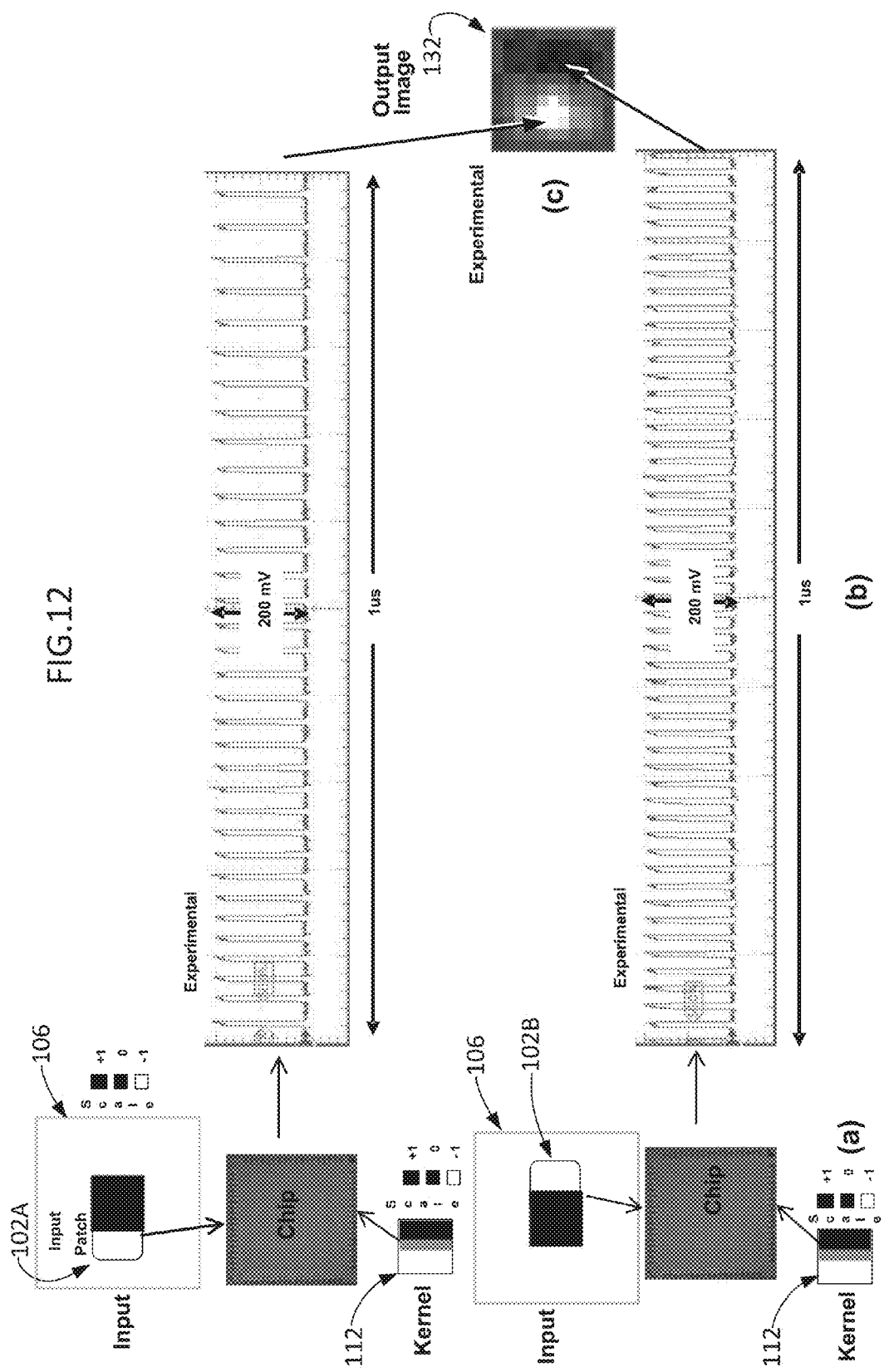
FIG. 12 is schematic diagram illustrating experimentally measured waveforms generated by a chip according to one embodiment of the present invention.

FIG. 12 is schematic diagram illustrating experimentally measured waveforms generated by a chip according to one embodiment of the present invention. As seen in FIG. 12, the input image 106 is of a small black square of size 5×5 pixels surrounded by a white border and the 5×5 pixel kernel 112 includes two columns of white pixels on the left, a column of gray pixels in the center, and two columns of black pixels on the right. The upper portion of FIG. 12 illustrates the processing of a first input patch 102A on the left side of the black square. The first input patch 102A closely resembles the kernel 112. Because of the similarity between the first input patch 102A and the kernel 112, the chip outputs a signal at a high rate, which is mapped to a light (e.g., white) pixel in the output image 132 of the chip. In contrast, the lower portion of FIG. 12 illustrates the processing of a second input patch 102B on the right side of the black square. Because the second input patch 102B is quite different from the kernel 112, the chip outputs a signal at a high rate, which is mapped to a dark (e.g., black) pixel in the output image 132 of the chip. (Note that this is the inverse of, for example, FIGS. 1 and 11, in which portions of the input image that are similar to the kernel are mapped to dark or black pixels in the output region, and portions of the input image that are different from the kernel are mapped to light or white pixels in the output image. This inversion of the output is done for consistency of conventions used in image processing literature. However, embodiments of the present invention are not limited thereto.)

The experimental output image 122 in FIG. 12 shows the image that was built by the chip in response to the one hundred input patches. For each input patch the chip was reset and, as described above, each input patch was input to the chip for 1 μs. The spike rate of the $Out_z$ signal was measured by measuring the instantaneous cycle time of the pulse signal 0.8 µs after each reset and image patch update using a digital oscilloscope controlled by a computer. The experimental output image 122 is 10×10 pixels in size and each of the 100 pixels is in gray scale. Light pixels indicate low spike rates and dark pixels indicate high spike rates.

The circuit was tested again on a larger image. FIG. 13A shows the input image 104, which has a size of 512×512 pixels. FIG. 13B shows the convolution kernel 114 of size 5×5 pixels that was applied during the test.

FIG. 13C shows a plot of an image of the ideal output convolution 122 of the input image 104 of FIG. 13A with the kernel 114 of FIG. 13B, where the ideal output convolution 122 was generated using ideal equations.

FIG. 13D shows the convolution output 134 experimentally measured from the chip when sequentially supplying the chip with patches from the input image 104 of FIG. 13A and the kernel 114 of FIG. 13B. The convolution output image 134 shown in FIG. 13D has size 508×508 pixels and was generated by supplying patches of the input image 104 to the chip one patch at a time, in a manner similar to that described above with respect to FIG. 12. The gray level value of each pixel represents the spike rate of the pulse signal produced by the chip at about 0.8 µs after the chip was reset and supplied with the input image patch. Like in FIG. 12, the output images in FIGS. 13C and 13D are inverted when compared to FIGS. 1 and 11 in that regions of higher similarity (e.g., lower output spike rates) are mapped to lighter output pixels and regions of lower similarity (e.g., higher output spike rates) are mapped to darker output pixels.

FIG. 13E shows an error image 136 representing the difference between the ideal output 122 shown in FIG. 13C and the experimental output 134 shown in FIG. 13D according to one embodiment of the present invention. FIG. 13F is a histogram 138 of the error for all the pixels of the convolution output image 134 according to one embodiment of the present invention. As seen in FIGS. 13E and 13F, the experimental output 134 is quite close to the ideal output 122. In addition, the standard deviation of the error is 1.72% of the full range, which is the error expected by transistor-level simulations of ideal computations.

The experimentally measured power consumption of the chip is 1.62 mW, which is slightly better (about 13% lower) than the simulated value.

As such, embodiments of the present invention provide a circuit and a method for performing a spike domain convolution. In contrast to related circuits, embodiments of the present invention can be performed without the use of analog or digital multipliers and instead uses 1-bit DACs with variable gain to perform the multiplication operations. The 1-bit DACs use significantly less power than analog and digital multipliers. As such, embodiments of the present invention can perform accurate convolutions with about 3 orders of magnitude less energy than a general purpose microprocessor. In addition, embodiments of the present invention achieve better accuracy than comparative fully analog convolution circuits and use less physical area than digital implementations, thereby providing low energy usage per computation and high operation speed.

Embodiments of the present invention may be implemented, for example, as an application specific integrated circuit (ASIC) or as a component of a digital signal processor (DSP).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A convolution circuit comprising:
   a plurality of input oscillators, each of the input oscillators being configured to:
      receive a corresponding analog input signal of a plurality of analog input signals; and
      output a corresponding spiking signal of a plurality of spiking signals, the corresponding spiking signal having a spiking rate in accordance with a magnitude of the corresponding analog input signal;
   a plurality of 1-bit DACs, each of the 1-bit DACs being configured to:
      receive the corresponding spiking signal of the plurality of spiking signals from a corresponding one of the input oscillators; and
      receive a corresponding weight of a convolution kernel comprising a plurality of weights;
      output a corresponding weighted output of a plurality of weighted outputs in accordance with the corresponding spiking signal and the corresponding weight; and
   an output oscillator configured to generate an output spike signal in accordance with the plurality of weighted outputs from the plurality of 1-bit DACs.

2. The convolution circuit of claim 1, wherein the plurality of weighted outputs are currents.

3. The convolution circuit of claim 2, further comprising a summing node between the plurality of 1-bit DACs and the output oscillator,
   wherein the plurality of 1-bit DACs are configured to output the weighted outputs to the summing node, and
   wherein the output oscillator is configured to generate the output spike signal in accordance with a signal at the summing node.

4. The convolutional circuit of claim 3, further comprising a capacitor coupled between the summing node and ground.

5. The convolutional circuit of claim 1, wherein each of the input oscillators comprises:
   a transconductance amplifier having an input terminal configured to receive the analog input signal and an output terminal coupled to an accumulating node;
   a capacitor coupled between the accumulating node and ground;
   a first reset switch coupled between the accumulating node and ground;
   a comparator having a non-inverting input coupled to the accumulating node and an output coupled to a corresponding one of the 1-bit DACs; and
   a first delay comprising:
      an input coupled to the output of the comparator; and
      an output configured to control the first reset switch.

6. The convolutional circuit of claim 5, wherein each of the input oscillators further comprises:
   a second reset switch coupled between the accumulating node and the first reset switch; and
   a second delay comprising:
      an input coupled to the output of the comparator; and
      an output configured to control the second reset switch.

7. The convolutional circuit of claim 1, wherein each of the 1-bit DACs comprises:
   a first current mirror having a gain of 1 comprising a first terminal and a second terminal;

a second current mirror having a gain of 1 comprising a first terminal coupled to the first terminal of the first current mirror and a second terminal;

a third current mirror having a gain greater than 1 comprising a first terminal and a second terminal coupled to the second terminal of the second current mirror;

a bottom differential pair coupled to a current source and configured to receive a reference voltage and the corresponding weight;

a first upper differential pair coupled to the bottom differential pair, the first current mirror, and the second current mirror; and a second upper differential pair coupled to the first upper differential pair, the bottom differential pair, the first current mirror, and the second current mirror.

8. The convolutional circuit of claim 1, wherein each of the 1-bit DACs comprises:
an auxiliary circuit comprising:
a first input terminal configured to receive the corresponding weight;
a second input terminal configured to receive the corresponding spiking signal;
a first output terminal configured to output an absolute value of the corresponding weight; and
a second output terminal configured to output a plurality of control signals; and
a DAC core comprising:
a first current mirror;
a second current mirror;
a plurality of current controlled current sources configured to be controlled by the absolute value of the corresponding weight; and
a plurality of control transistors configured to be controlled by the control signals, the plurality of control transistors being coupled between the first and second current mirrors and the plurality of current controlled current sources.

9. The convolutional circuit of claim 1, wherein the output oscillator comprises:
an input low pass filter having a first terminal coupled to the 1-bit DACs;
a transconductance amplifier having an input terminal coupled to a second terminal of the input low pass filter and an output terminal coupled to an accumulating node;
a capacitor coupled between the accumulating node and ground;
a first reset switch coupled between the accumulating node and a reset voltage;
a comparator having a non-inverting input coupled to the accumulating node and an output coupled to a corresponding one of the 1-bit DACs; and
a first delay comprising:
an input coupled to the output of the comparator; and
an output configured to control the first reset switch.

10. The convolutional circuit of claim 1, further comprising an output low pass filter coupled to an output of the output oscillator.

11. The convolutional circuit of claim 1, wherein each of the spiking signals comprises a plurality of pulses, wherein the spiking rate corresponds to a time between adjacent ones of the pulses.

12. The convolutional circuit of claim 1, wherein each of the weighted outputs is a current.

13. The convolutional circuit of claim 12, wherein each of the spiking signals comprises a plurality of pulses,
wherein the spiking rate corresponds to a time between adjacent ones of the pulses, and
wherein each of the weighted outputs has a positive current during a pulse of a corresponding spiking signal and a negative current during the time between adjacent ones of the pulses.

14. The convolutional circuit of claim 1, wherein the analog input signals correspond to an image.

15. A method for convolving a plurality of analog input signals with a kernel represented by plurality of weights, the method comprising:
converting the analog input signals to a plurality of corresponding spiking signals, each of the spiking signals having a spiking rate;
supplying the spiking signals and the weights of the kernel to 1-bit DACs to generate weighted outputs;
integrating the weighted outputs to generate an integrated weighted output;
controlling an output oscillator based on the integrated weighted output; and
generating an output spike signal from the output oscillator, the output spike signal having an output spiking rate corresponding to a convolution of the analog input signals with the kernel.

16. The method of claim 15, further comprising applying a low pass filter to the output spike signal.

17. The method of claim 15, wherein each of the spiking signals comprises a plurality of pulses, and
wherein the spiking rate corresponds to a time between adjacent ones of the pulses.

18. The method of claim 15, wherein each of the weighted outputs is a current.

19. The method of claim 18, wherein each of the spiking signals comprises a plurality of pulses,
wherein the spiking rate corresponds to a time between adjacent ones of the pulses, and
wherein each of the weighted outputs has a positive current during a pulse of a corresponding spiking signal and a negative current during the time between adjacent ones of the pulses.

20. The method of claim 15, wherein the analog input signals correspond to an image.

* * * * *